(12) United States Patent
Kimura et al.

(10) Patent No.: US 8,275,056 B2
(45) Date of Patent: Sep. 25, 2012

(54) RECEIVER, INTEGRATED CIRCUIT, AND RECEPTION METHOD

(75) Inventors: Tomohiro Kimura, Osaka (JP); Kenichiro Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 12/307,783

(22) PCT Filed: Jul. 30, 2007

(86) PCT No.: PCT/JP2007/064896
§ 371 (c)(1),
(2), (4) Date: Jan. 7, 2009

(87) PCT Pub. No.: WO2008/023539
PCT Pub. Date: Feb. 28, 2008

(65) Prior Publication Data
US 2009/0207956 A1    Aug. 20, 2009

(30) Foreign Application Priority Data
Aug. 21, 2006 (JP) .................................. 2006-224389

(51) Int. Cl.
    *H04B 1/10* (2006.01)
(52) U.S. Cl. .................. 375/260; 375/232; 375/350
(58) Field of Classification Search .............. 375/229, 375/230, 232, 260, 267, 343, 346, 348–350
    See application file for complete search history.

(56) References Cited

U.S. PATENT DOCUMENTS

| 5,602,835 | A | 2/1997 | Seki et al. |
| 7,388,922 | B2 | 6/2008 | Yamagata |
| 2006/0104376 | A1 | 5/2006 | Abe |

FOREIGN PATENT DOCUMENTS

| JP | 7-143097 | 6/1995 |
| JP | 2002-261729 | 9/2002 |
| JP | 2005-191662 | 7/2005 |
| JP | 2005-286636 | 10/2005 |
| JP | 2005-287043 | 10/2005 |
| JP | 2006-148387 | 6/2006 |
| JP | 2006-203613 | 8/2006 |
| WO | 2005/048546 | 5/2005 |

OTHER PUBLICATIONS

International Search Report issued Oct. 31, 2007 in the International (PCT) Application of which the present application is the U.S. National Stage.

*Primary Examiner* — David B. Lugo
(74) *Attorney, Agent, or Firm* — Wenderoth, Lind & Ponack L.L.P.

(57) ABSTRACT

A channel characteristic calculation unit 23 estimates channel characteristics based on SP signals included in received signals, and a symbol interpolation filter 24 frequency-shifts frequency transfer characteristics and filters output signals of the channel characteristic calculation unit 23. A filter control unit 27 estimates channel characteristics based on CP signals included in the received signals and observes the estimated channel characteristics to determine a shift amount by which the symbol interpolation filter 24 frequency-shifts the frequency transfer characteristics. The symbol interpolation filter 24 frequency-shifts the frequency transfer characteristics based on the shift amount determined by the filter control unit 27.

14 Claims, 18 Drawing Sheets

FIG. 8
(a) 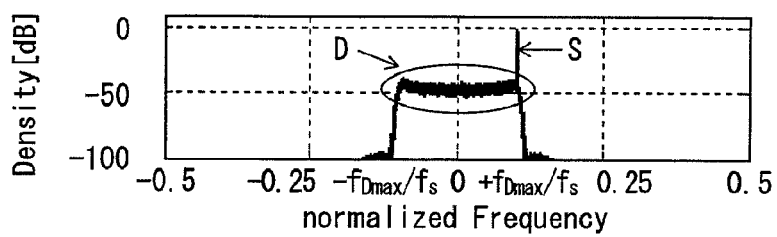
(b) 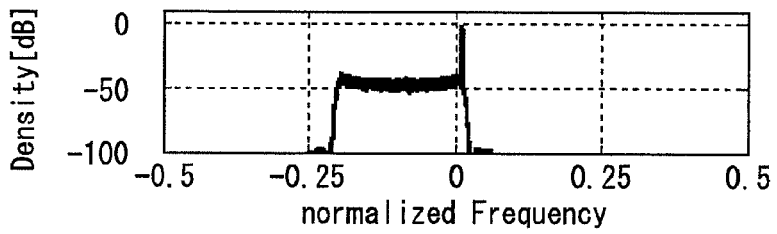
(c) 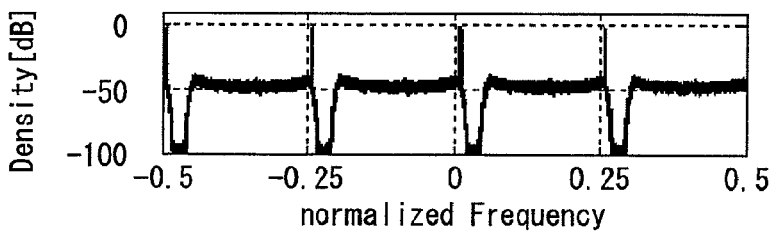
(d) 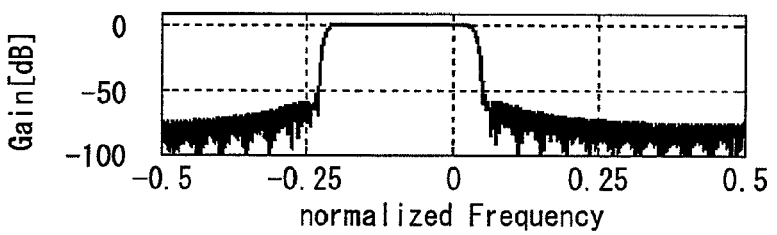
(e) 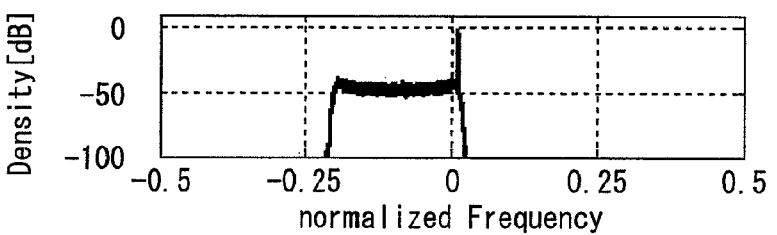
(f) 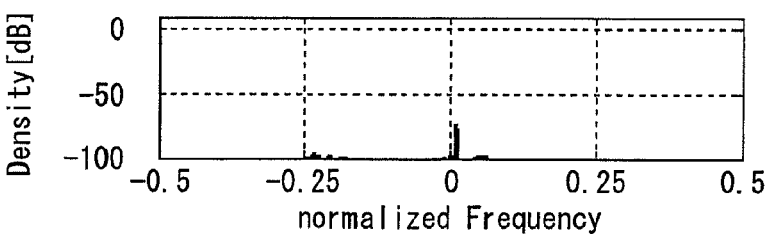
(g) 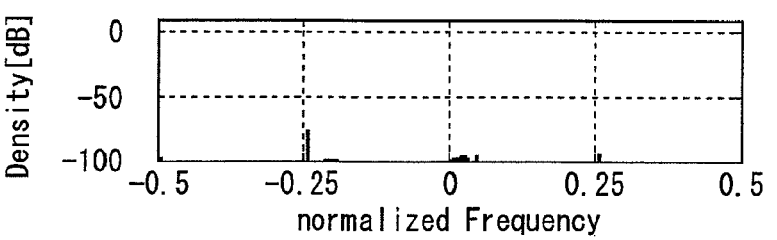

● SP SIGNAL
○ DATA-MODULATED SIGNAL

RECEIVER, INTEGRATED CIRCUIT, AND RECEPTION METHOD

TECHNICAL FIELD

The present invention relates to an equalization technique to compensate for propagation distortion during mobile reception of digital terrestrial broadcasting or the like.

BACKGROUND ART

Digital terrestrial broadcasting includes, for example, ISDB-T (Integrated Services Digital Broadcasting—Terrestrial) system in Japan and DVB-T (Digital Video Broadcasting—Terrestrial) system in Europe, and these systems use OFDM (Orthogonal Frequency Division Multiplexing) method, which is one of multi-carrier transmission systems.

In the ISDB-T system and DVB-T system, transmitters periodically transmit scattered pilot signals (hereinafter, referred to as "SP signals") which are pilot signals BPSK (Binary Phase Shift Keying)-modulated using an amplitude and phase known to receivers. Receivers sequentially estimate channel characteristics by observing the amplitude and phase of the SP signals included in received signals, and equalize the received signals using the estimated channel characteristics.

FIG. 16 is a schematic diagram showing signal arrangement of SP signals transmitted in the ISDB-T system and DVB-T system. In FIG. 16, the vertical axis indicates time in symbol units, while the horizontal axis indicated frequency in carrier units. Note that black circles are SP signals, and white circles are data-modulated signals which are modulated by transmission data.

The SP signals are transmitted after being arranged as follows: an SP signal appears every 12th carrier in each symbol; each SP signal is shifted by three carriers per symbol; and the arrangement of the SP signals is repeated in cycles of four symbols.

Next, FIG. 17 shows a structure of a conventional receiver which receives digital terrestrial broadcasting using OFDM transmission system.

In a receiver 100, broadcast waves from broadcast stations are received by an antenna 101 via paths. Then a tuner 102 tunes in to a desired broadcast wave from among the multiple broadcast waves received by the antenna 101 and converts the broadcast wave to a predetermined frequency band.

The AFC (Automatic Frequency Control) unit 103 eliminates, from the received signals input from the tuner 102, a frequency error which has occurred when the tuner 102 tuned into the broadcast wave, and outputs the received signals from which the frequency error has been eliminated, to a subsequent circuit unit. Note that a structure of the AFC unit 103 is disclosed, for example, in Patent Document 1.

The symbol synchronization unit 104 estimates a symbol timing based on the received signals input from the AFC unit 103. The Fourier transform unit 105 performs Fourier transform on the received signals input from the AFC unit 103 in accordance with the symbol timing estimated by the symbol synchronization unit 104.

The equalization unit 106 estimates channel characteristics based on the received signals input from the Fourier transform unit 105, and equalizes the received signals based on the estimated channel characteristics.

Next, FIG. 18 shows a structure of the equalization unit 106 in FIG. 17. The structure of the equalization unit 106 in FIG. 17 is the structure disclosed by Patent Document 2.

At the equalization unit 106, the received signals Fourier transformed by the Fourier transform unit 105 are supplied to an SP signal extraction unit 151 and a division unit 153.

The SP signal extraction unit 151 extracts SP signals from the received signals and estimates, using the extracted SP signals, channel characteristics of the positions where the SP signals are arranged (hereinafter, referred to as "SP signal positions"). A channel estimation unit 152 estimates channel characteristics of positions where the data-modulated signals are arranged (hereinafter, referred to as "data-modulated signal positions"), based on the channel characteristics of the SP signal positions. The division unit 153 divides the data-modulated signals by the channel characteristics estimated by the channel estimation unit 152, thereby equalizing the data-modulated signals.

Note that while details of the channel estimation unit 152 are not disclosed in Patent Document 2, in general, the channel estimation unit 152 includes a symbol interpolation filter 152a and a carrier interpolation filter 152b, the filter 152a performing interpolation processing in the symbol direction and the carrier interpolation filter 152b performing interpolation processing in the carrier direction.

A Doppler frequency estimation unit 154 observes temporal variation of the channel characteristics estimated by the SP signal extraction unit 151 and estimates the varying speed of the channel characteristics, that is to say, the Doppler frequency. An interpolation filter selection unit 156 selects a filter coefficient stored in a filter coefficient ROM (Read Only Memory) 155 in accordance with the Doppler frequency estimated by the Doppler frequency estimation unit 154.

The symbol interpolation filter 152a changes the passband width of the frequency transfer characteristics of the filter in accordance with the filter coefficient selected by the interpolation filter selection unit 152, and performs interpolation processing in the symbol direction.

Note that the narrower the passband width is, the more effectively the symbol interpolation filter 152a can eliminate noise included in the channel characteristics estimated by the SP signal extraction unit 151. Also, the slower the moving speed of the receiver is, the narrower the frequency bandwidth occupied by the variation of the channel characteristics due to the Doppler variation is. Accordingly, the slower the moving speed of the receiver is, the narrower the passband width of the symbol interpolation filter 152a can be. The equalization unit 106 effectively eliminates noise included in channel characteristics by adjusting the passband width of the frequency transfer characteristics in accordance with the moving speed of the receiver.

It should be noted that according to the arrangement of the SP signals shown in FIG. 16, the channel characteristics estimated by the SP signal extraction unit 151 are obtained only in cycles of four symbols in the symbol direction. Accordingly, when the symbol cycle is T seconds, the passband width of the symbol interpolation filter 152a cannot be made wider than 1/(4T) hertz due to the sampling theorem of complex signals.

Patent Document 1: Japanese Patent Publication No. 3074103
Patent Document 2: Japanese Laid-Open Patent Application Publication No. 2005-286636

DISCLOSURE OF THE INVENTION

Problems the Invention is Going to Solve

The following describes operations of the conventional receiver 100 with reference to FIG. 19. FIG. 19 shows a case under the Rice fading environment in which specular waves (also called "direct waves" or "static waves") and scattered waves are simultaneously received. In this case, the specular waves arrive from the front in the moving direction of the receiver and are accompanied by Doppler frequency shifting. Note that the scattered waves are assumed to arrive evenly from all directions.

In each of FIGS. 19(a) to (g), the horizontal axis indicates a frequency normalized by a symbol frequency $f_s$. In FIGS. 19(a) to (c) and (e) to (g), the vertical axis indicates spectral density (dB), while in FIG. 19(d), the vertical axis indicates gain (dB). Note that the symbol frequency $f_s=1/T$ hertz, where the symbol cycle is T seconds.

FIG. 19(a) shows, in terms of spectral density in equivalent low-frequency, temporal variation of channel characteristics under a Rice fading environment where the specular waves arrive from the front in the moving direction of the receiver. In FIG. 19(a), S represents a specular wave component, and D (in the oval) represents a scattered wave component. The scattered wave component D is distributed from $-f_{Dmax}$ to $+f_{Dmax}$ with the maximum Doppler frequency being $+f_{Dmax}$. The specular wave component S arriving from the front in the moving direction shifts in frequency to $+f_{Dmax}$.

FIG. 19(b) shows, in terms of the spectral density, temporal variation of the channel characteristics observed based on the received signals output from the AFC unit 103. When the received power of the specular wave component S is larger than that of the scattered wave component D, the AFC unit 103 regards the Doppler frequency shifting as a frequency error of the received signals and performs frequency control to eliminate the frequency error from the received signals. This way, the received signals input to the AFC unit 103 are frequency-shifted such that, of the spectral density of the channel characteristics observed based on the received signals output from the AFC unit 103, the specular wave component S comes close to a direct current (frequency is 0). The AFC unit 103 frequency-shifts the channel characteristics of the received signals in a virtual manner.

FIG. 19(c) shows, in terms of the spectral density, temporal variation of channel characteristics observed based on the SP signals included in the received signals input from the AFC unit 103 to the equalization unit 106 via the Fourier transform unit 105. In ISDB-T system and DVB-T system, as shown in FIG. 16, SP signal are placed once every four symbols in the symbol direction. Accordingly, in the channel characteristics observed at the SP signal positions, aliasing occurs in cycles of ¼ of the symbol frequency $f_s$ ($=f_s/4$).

FIG. 19(d) shows the frequency transfer characteristics of the symbol interpolation filter 152a. The symbol interpolation filter 152a estimates the channel characteristics of the received signals output from the AFC unit 103 shown in FIG. 19(b) by filtering the channel characteristics observed at the SP signal positions shown in FIG. 19(c).

FIG. 19E shows, in terms of the spectral density, channel characteristics obtained by filtering, by the symbol interpolation filter 152a, desired channel characteristics components (channel characteristics of the received signals output from the AFC unit 103 shown in FIG. 19(b)) among the channel characteristics observed at the SP signal positions shown in FIG. 19(c).

FIG. 19(f) shows, in terms of the spectral density, channel characteristic components blocked by filtering, by the symbol interpolation filter 152a, the desired channel characteristics components among the channel characteristics observed at the SP signal positions shown in FIG. 19(c).

It is obvious from FIGS. 19(e) and (f) that the channel characteristics output from the symbol interpolation filter 152a lack low frequency components compared with the desired channel characteristics.

FIG. 19(g) shows, in terms of the spectral density, channel characteristics obtained by filtering, by the symbol interpolation filter 152a, channel characteristic components due to aliasing (the channel characteristics observed at the SP signals shown in FIG. 19(c), excluding the desired channel characteristics shown in FIG. 19(b)) among the channel characteristics observed at the SP signal positions shown in FIG. 19(c).

The components in FIGS. 19(f) and (g) are interpolation errors generated by the symbol interpolation filter 152a and cause errors in channel characteristic estimation by the channel estimation unit 152 and errors in demodulation by the equalization unit 106.

However, changing the passband width of the frequency transfer characteristics of the symbol interpolation filter 152a in accordance with the Doppler frequency cannot reduce both of the components in FIGS. 19(f) and (g) at the same time. Thus, it is difficult for the conventional receiver to reduce the errors in demodulation performed by the equalization unit 106.

The following should be noted here. In the above description, the Rice fading environment is given as an example. However, also under a propagation environment where multiple specular waves are simultaneously received, when received multiple specular waves are under effects of the Doppler frequency shifting which differ depending on arrival directions, a problem similar to that under the Rice fading environment occurs, the propagation environment including such as a multi-path propagation environment where reflective waves include specular waves, or an SFN (Single Frequency Network) environment using multi-path resistance of OFDM method. This is due to frequency control performed by the AFC unit 103 which regards the Doppler frequency shifting in an arrival wave with relatively large power as a frequency error of the received signals.

Thus, the present invention aims to provide a receiver, an integrated circuit, and a receiving method which have achieved an improvement on receiving quality by being able to estimate temporal variation of channel characteristics more accurately.

Means of Solving the Problems

In order to solve the stated problem, the present invention provides a receiver including: a channel characteristic calculation unit operable to calculate, based on pilot signals included in received signals, channel characteristics with respect to the pilot signals; a filter unit operable to perform, on the channel characteristics, processing which is at least one of (i) an interpolation and (ii) band limitation, using filter processing whose frequency transfer characteristics are able to be frequency-shifted; an equalization unit operable to equalize the received signals based on channel characteristics obtained as a result of the processing performed by the filter unit; and a filter control unit operable to determine a shift amount by which the frequency transfer characteristics are frequency-shifted, and control the frequency transfer characteristics. Here, the filter control unit observes channel characteristics with respect to first signals included in the received signals and determines the shift amount based on a result of the observation, and the filter unit frequency-shifts the frequency transfer characteristics by the determined shift amount.

The present invention also provides an integrated circuit including: a channel characteristic calculation unit operable to calculate, based on pilot signals included in received signals, channel characteristics with respect to the pilot signals; a filter unit operable to perform, on the channel characteristics, processing which is at least one of (i) an interpolation and (ii) band limitation, using filter processing whose frequency transfer characteristics are able to be frequency-shifted; an equalization unit operable to equalize the received signals based on channel characteristics obtained as a result of the processing performed by the filter unit; and a filter control unit operable to determine a shift amount by which the frequency transfer characteristics are frequency-shifted, and control the frequency transfer characteristics. Here, the filter control unit observes channel characteristics with respect to first signals included in the received signals and determines the shift amount based on a result of the observation, and the filter unit frequency-shifts the frequency transfer characteristics by the determined shift amount.

The present invention also provides a reception method including: a channel characteristic calculation step of calculating, based on pilot signals included in received signals, channel characteristics with respect to the pilot signals; a filtering step of performing, on the channel characteristics, processing which is at least one of (i) an interpolation and (ii) band limitation, using filter processing whose frequency transfer characteristics are able to be frequency-shifted; an equalizing step of equalizing the received signals based on channel characteristics obtained as a result of the processing performed by the filter unit; and a filter controlling step of determining a shift amount by which the frequency transfer characteristics are frequency-shifted, and controlling the frequency transfer characteristics. Here, the filter controlling step observes channel characteristics with respect to first signals included in the received signals and determines the shift amount based on a result of the observation, and the filtering step frequency-shifts the frequency transfer characteristics by the determined shift amount.

Note that when let $f(f)$ be the frequency transfer characteristics, $\Delta f$ be the shift amount by which to frequency-shift the frequency transfer characteristics $f(f)$, and $g(f)$ be the frequency transfer characteristics after frequency-shifting the frequency transfer characteristics $f(f)$ by the shift amount $\Delta f$, the following relationship is satisfied: $f(f)=g(f+\Delta f)$.

Effects of the Invention

According to each of the stated receiver, integrated circuit, and receiving method, the filter control unit observes the channel characteristics with respect to the first signals, and frequency-shifts the frequency transfer characteristics of the filter unit based on an observation result. This increases the ratio of, among the channel characteristics calculated by the channel characteristic calculation unit, the desired channel characteristic components passing through the filter unit. Furthermore, this decreases the ratio of the components, which are other than the desired channel characteristic components, passing through the filter unit. Consequently, temporal variation of the channel characteristics can be estimated more accurately.

In the above-described receiver, the pilot signals may occur every M-th symbol in the received signals, M being an integer of 2 or more, the first signals may occur every N-th symbol in the received signals, N being an integer of 1 or more which is smaller than M, the filter control unit may include: a first channel characteristic calculation unit operable to calculate the channel characteristics with respect to the first signals based on the first signals; a first filter unit operable to perform filter processing on the channel characteristics calculated by the first channel characteristic calculation unit, while sequentially frequency-shifting the frequency transfer characteristics of the filter processing; and a shift amount determination unit operable to observe output signals of the first filter unit and determine the shift amount based on the result of the observation.

In the above-described receiver, the shift amount determination unit may include: a power value calculation unit operable to, for each of the output signals, calculate an electric power value and output a calculation result as an output signal; and a maximum value detection unit operable to (i) detect, by observing the output signals of the power value calculation unit, a maximum value among values of the output signals of the power value calculation unit and (ii) determine the shift amount, based on a shift amount of the frequency transfer characteristics of the first filter unit when the output signal of the power value calculation unit is the maximum value.

In the above-described receiver, the shift amount determination unit may include: a difference calculation unit operable to, for each of output signals of the first channel characteristic calculation unit, (i) calculate a difference between (a) the output signal of the first channel characteristic calculation unit and (b) a signal obtained as a result of performing the filtering processing on the output signal of the first channel characteristic calculation unit by the first filter unit and (ii) output the difference as an output signal; a power value calculation unit operable to, for each of the output signals of the difference calculation unit, calculate an electric power value and output a calculation result as an output signal; and a minimum value detection unit operable to (i) detect, by observing the output signals of the power value calculation unit, a minimum value among values of the output signals of the power value calculation unit and (ii) determine the shift amount, based on a shift amount of the frequency transfer characteristics of the first filter unit when the output signal of the power value calculation unit is the minimum value.

According to the stated structures, the receiver determines the shift amount by which the frequency transfer characteristics of the filter unit are frequency-shifted using the channel characteristics in which aliasing components appear at intervals longer than those at which the aliasing components of the channel characteristics calculated by the channel characteristic calculation unit appear. Accordingly, the receiver can determine the shift amount without including aliasing components, enabling more appropriate determination of the shift amount as a result.

In the above-described receiver, the first signals may be inserted in every symbol.

In the above-described receiver, the first signals may be continual pilot signals in a DVB-T system.

In the above-described receiver, the first signals may be one of TMCC signals in an ISDB-T system and TPS signals in a DVB-T system.

According to the stated structures, the receiver can determine the shift amount using the channel characteristics in which aliasing components appear at the longest intervals.

In the above-described receiver, the first characteristic calculation unit may include: a decoding unit operable to decode the one of the TMCC signals and the TPS signals; a remodulation unit operable to perform DBPSK-modulation, based on a decoding result of the decoding unit, with respect to control information transmitted using the one of the TMCC signals and the TPS signals; and a calculation unit operable to calculate the channel characteristics with respect to the one of the TMCC signals and the TPS signals based on (a) the one of the TMCC signals and the TPS signals inserted in the received signals and (b) one of TMCC signals and TSP signals obtained as a result of the DBPSK-modulation.

According to the stated structure, the receiver is able to provide one type of calculation of the channel characteristics using TMCC signals or TPS signals.

In the above-described receiver, the filter unit may be able to change a passband width of the frequency transfer characteristics, the filter control unit may observe the channel characteristics with respect to the first signals and determines the passband width based on the result of the observation; and the filter unit may change the passband width of the frequency transfer characteristics based on the passband width determined by the filter control unit.

According to the stated structure, the receiver can perform more appropriate control on the passband width of the filter unit so as to further decrease the ratio of the components, which are other than the components of the desired channel characteristics, passing through the filter unit, while maintaining the high ratio of, among the channel characteristics calculated by the channel characteristic calculation unit, the desired channel characteristic components passing through the filter unit.

The present invention also provides a receiver including: an automatic frequency control unit operable to frequency-shift received signals so as to eliminate a frequency error in the received signals; a channel characteristic calculation unit operable to calculate, based on pilot signals included in the frequency-shifted received signals, channel characteristics with respect to the pilot signals; a filter unit operable to perform, on the channel characteristics, processing which is at least one of (i) an interpolation and (ii) band limitation, using filter processing; an equalization unit operable to equalize the received signals based on channel characteristics obtained as a result of the processing performed by the filter unit; and a control unit operable to determine a shift amount by which the automatic frequency control unit frequency-shifts the received signals, and controls frequency-shifting of the received signals by the automatic frequency control unit. Here, the control unit observes channel characteristics with respect to first signals included in the received signals and determines the shift amount based on a result of the observation, and the automatic frequency control unit frequency-shifts the received signals by the determined shift amount.

The present invention also provides an integrated circuit including: an automatic frequency control unit operable to frequency-shift received signals so as to eliminate a frequency error in the received signals; a channel characteristic calculation unit operable to calculate, based on pilot signals included in the frequency-shifted received signals, channel characteristics with respect to the pilot signals; a filter unit operable to perform, on the channel characteristics, processing which is at least one of (i) an interpolation and (ii) band limitation, using filter processing; an equalization unit operable to equalize the received signals based on channel characteristics obtained as a result of the processing performed by the filter unit; and a control unit operable to determine a shift amount by which the automatic frequency control unit frequency-shifts the received signals, and controls frequency-shifting of the received signals by the automatic frequency control unit. Here, the control unit observes channel characteristics with respect to first signals included in the received signals and determines the shift amount based on a result of the observation, and the automatic frequency control unit frequency-shifts the received signals by the determined shift amount.

The present invention also provides a reception method including: an automatic frequency controlling step of frequency-shifting received signals so as to eliminate a frequency error in the received signals; a channel characteristic calculating step of calculating, based on pilot signals included in the frequency-shifted received signals, channel characteristics with respect to the pilot signals; a filtering step of performing, on the channel characteristics, processing which is at least one of (i) an interpolation and (ii) band limitation, using filter processing; an equalizing step of equalizing the received signals based on channel characteristics obtained as a result of the processing performed by the filter unit; and a controlling step of determining a shift amount by which the automatic frequency control unit frequency-shifts the received signals, and controlling frequency-shifting of the received signals by the automatic frequency control unit. Here, the controlling step observes channel characteristics with respect to first signals included in the received signals and determines the shift amount based on a result of the observation, and the automatic frequency controlling step frequency-shifts the received signals by the determined shift amount.

The above-stated receiver, integrated circuit, and receiving method each observe the channel characteristics with respect to the first signals, and based on the observation result, controls the shift amount by which the automatic frequency control unit frequency-shifts the received signals. This increases the ratio of, among the channel characteristics calculated based on the pilot signals, the desired channel characteristic components passing through the filter unit. Furthermore, this decreases the ratio of the components, which are other than the desired channel characteristic components, passing through the filter unit. Consequently, temporal variation of the channel characteristics can be estimated more accurately.

BRIEF DESCRIPTION OF THE DRAWINGS

FIGS. 8(*a*) to (*g*) are diagrams for explaining operations of the receiver of the first embodiment;

DESCRIPTION OF REFERENCE NUMERALS

Figure 1:
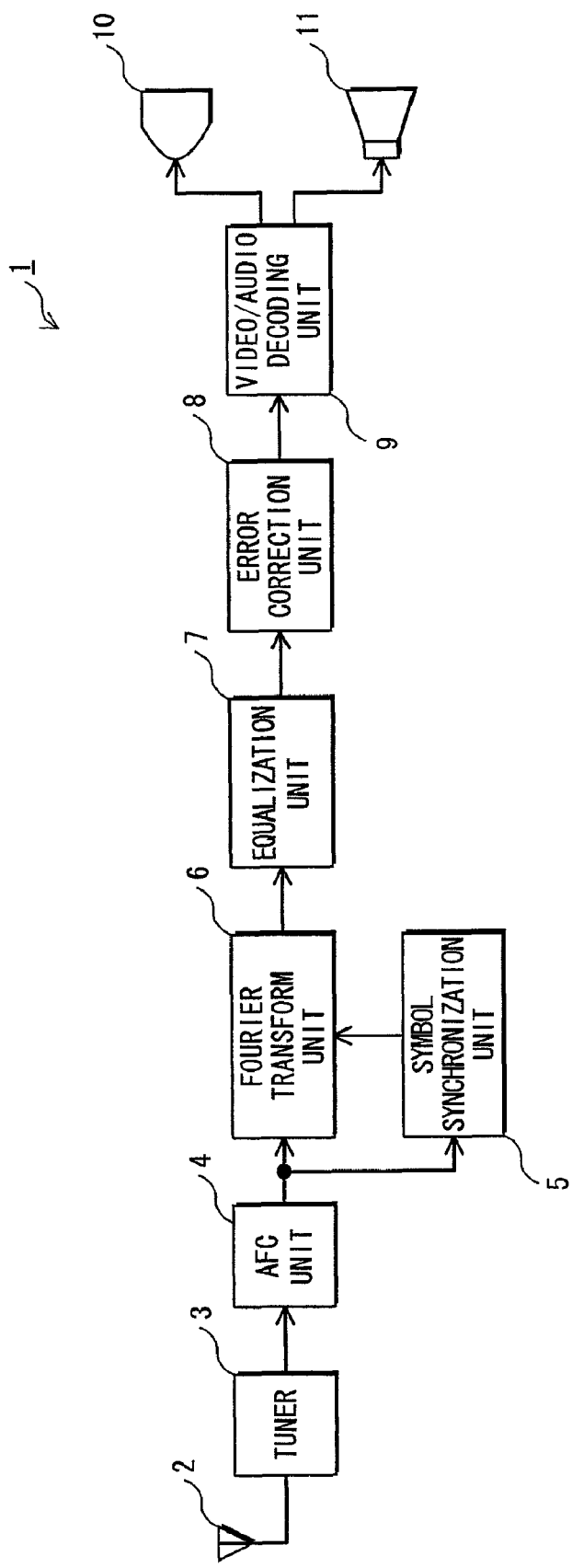
FIG. 1 shows a structure of a receiver of a first embodiment.

1 Receiver
2 Antenna
3 Tuner
4 AFC unit
5 Symbol synchronization unit
6 Fourier transform unit
7 Equalization unit
8 Error correction unit
9 Video/audio decoding unit
10 Display unit
11 Speaker
12 AFC control unit
15 Frequency oscillation unit
16 Multiplication unit
17 Delay unit
18 Correlation unit
19 Frequency error detection unit
21 SP signal extraction unit
22 SP signal generation unit
23, 43, 64 Channel characteristic calculation unit
24 Symbol interpolation filter
25 Carrier interpolation filter
26 Division unit
27, 27a, 27b, 27c Filter control unit
41 CP signal extraction unit
42 CP signal generation unit
44 Filter setting unit
45 Symbol filter
46, 46a Power value calculation unit
47 Maximum value detection unit
51 Delay unit
52 Difference calculation unit
53 Minimum value detection unit
61 TMCC signal extraction unit
62 TMCC decoding unit
63 TMCC remodulation unit

BEST MODE FOR CARRYING OUT THE INVENTION

First Embodiment

The following describes the first embodiment of the present invention with reference to the drawings.

<Structure of Receiver>

A receiver 1 of the present embodiment is described below with reference to FIG. 1. FIG. 1 shows a structure of the receiver 1 of the first embodiment, the structure being an exemplary structure of a receiver which receives digital terrestrial broadcasting using the OFDM transmission system.

The receiver 1 includes an antenna 2, a tuner 3, an AFC unit 4, a symbol synchronization unit 5, a Fourier transform unit 6, an equalization unit 7, an error correction unit 8, a video/audio decoding unit 9, a display unit 10, and a speaker 11.

The antenna 2 receives broadcast waves via paths from broadcast stations, which are not shown in the figure, and transmits the received broadcast waves to the tuner 3.

The tuner 3 tunes in to a desired broadcast wave from among the multiple broadcast waves received by the antenna 2, converts the broadcast wave to a predetermined frequency band, and outputs, to the AFC unit 4, the received signals pertaining to the predetermined frequency band which have resulted from the conversion.

The AFC unit 4 eliminates, from the received signals input from the tuner 3, a frequency error which has occurred when the tuner 3 tuned in to the broadcast wave, and outputs to the symbol synchronization unit 5 and the Fourier transform unit 6 the received signals from which the frequency error has been eliminated. Note that details of the AFC unit 4 are described later with reference to FIG. 2.

The symbol synchronization unit 5 estimates a symbol timing based on the received signals input from the AFC unit 4, and notifies the Fourier transform unit 6 of the estimated symbol timing.

The Fourier transform unit 6 performs Fourier transform on the received signals input from the AFC unit 4 in accordance with the symbol timing notified by the symbol synchronization unit 5, thereby transforming the received signals in the time domain to the received signals in the frequency domain. Following that, the Fourier transform unit 6 outputs to the equalization unit 7 the received signals in the frequency domain resulting from the Fourier transform.

The equalization unit 7 estimates channel characteristics based on the received signals in the frequency domain input from the Fourier conversion unit 6, and equalizes and demodulates the received signals based on the estimated channel characteristics. After that, the equalization unit 7 outputs the demodulated received signals to the error correction unit 8. Note that details of the equalization unit 7 are described later with reference to FIG. 4.

The error correction unit 8 performs error correction processing on the demodulated received signals input from the equalization unit 7 and outputs to the video/audio decoding unit 9 the received signals on which the error correction processing has been performed.

The video/audio decoding unit 9 performs decoding processing and outputs the decoded data resulting from the decoding processing either as video data to the display unit 10 or as audio data to the speaker 11.

The display unit 10 displays video based on the decoded data input from the video/audio decoding unit 9, and the speaker 11 outputs audio based on the decoded data input from the video/audio decoding unit 9.

<Structure of AFC Unit>

Figure 2:
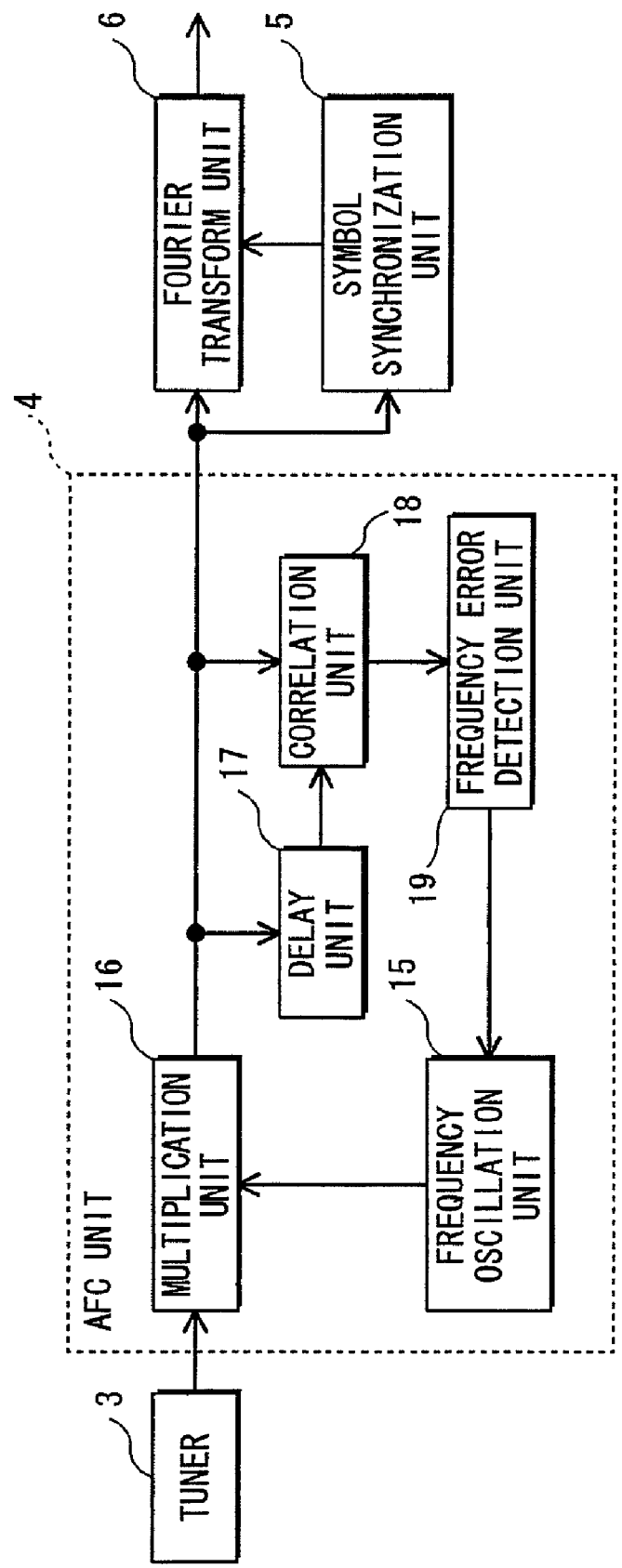
FIG. 2 shows a structure of an AFC unit in FIG. 1.

The structure of the AFC unit 4 in FIG. 1 is described with reference to FIG. 2. FIG. 2 shows a structure of the AFC unit 4 in FIG. 1.

The AFC unit 4 includes a frequency oscillation unit 15, a multiplication unit 16, a delay unit 17, a correlation unit 18, and a frequency error detection unit 19.

The frequency oscillation unit 15 oscillates complex sine waves whose oscillatory frequency is controlled by the frequency error detection unit 19, and outputs the oscillated complex sine waves to the multiplication unit 16.

The multiplication unit 16 multiplies the received signals input from the tuner 3 and the complex sine waves input from the frequency oscillation unit 15, and outputs the received signals resulting from the multiplication, to the symbol synchronization unit 5 and the Fourier transform unit 6, as well as to the delay unit 17 and the correlation unit 18.

The delay unit 17 outputs the received signals, which have been input from the multiplication unit 16, after delaying them for a period of time equivalent to the symbol duration of the useful symbol.

The correlation unit 18 performs correlation operation between the received signals input from the multiplication unit and the received signals input from the delay unit 17, and outputs the operation results to the frequency error detection unit 19. It should be noted that the received signals input from the delay unit 17 are delayed by the period of time equivalent to the symbol duration of the useful symbol.

The correlation unit 18 performs correlation operation between part of the useful symbol (the part being original data which is transmitted as a guard interval) and the signals transmitted in guard intervals.

The frequency error detection unit 19 divides the correlation phase angle input from the correlation unit 18 the useful symbol duration, thereby obtaining a frequency error. The frequency error detection unit 19 controls the oscillatory frequency of the frequency oscillation unit 15 based on the obtained frequency error such that the frequency error is small.

<Signal Arrangement of Scattered Pilot Signals and Continual Pilot Signals>

Figure 3:
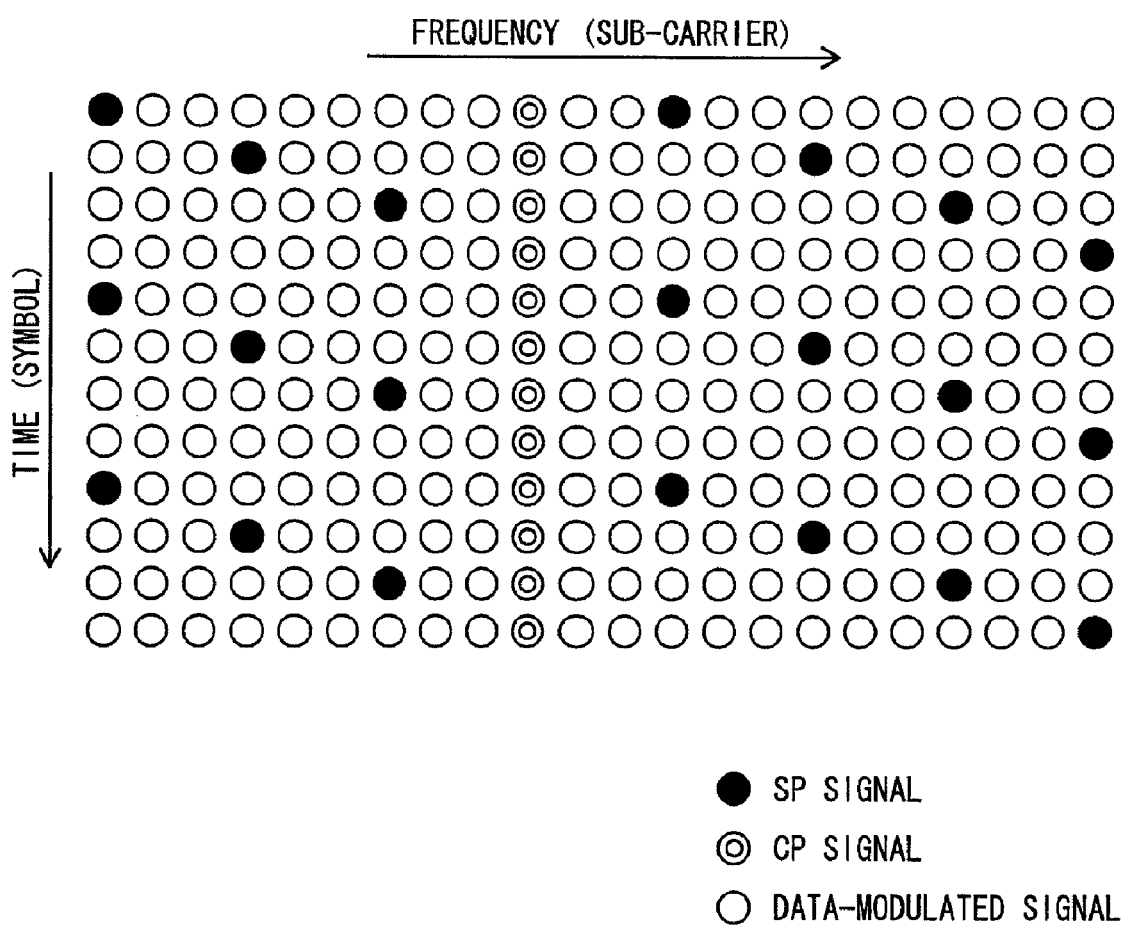
FIG. 3 is a schematic diagram showing signal arrangement of scattered pilot signals and continual pilot signals according to the DVB-T system.

Description is given on the signal arrangement of the scattered pilot signals (SP signals) and the continual pilot signals (CP signals) with reference to FIG. 3. FIG. 3 is a schematic diagram showing signal arrangement of the SP signals and CP signals according to the DVB-T system. Note that in FIG. 3, the vertical axis indicates time in symbol units while the horizontal axis indicates frequency in carrier units. Also note that black circles are SP signals, double circles are CP signals, and white circles are data-modulated signals modulated with transmission data.

The SP signals and CP signals each are BPSK (Binary Phase Shift Keying) modulated by the transmitter using a predetermined amplitude and a predetermined phase which are known to the receiver.

The SP signals are transmitted after being arranged as follows: an SP signal appears every 12th carrier in each symbol; each SP signal is shifted by three carriers per symbol; and the arrangement of the SP signals is repeated in cycles of four symbols.

The CP signals are transmitted after being arranged in predetermined carriers for every symbol. Because the CP signals may be arranged in a carrier in which the SP signals are arranged, part of the CP signals (one CP signal every four symbols) act as the SP signals as well.

<Structure of Equalization Unit>

Figure 4:
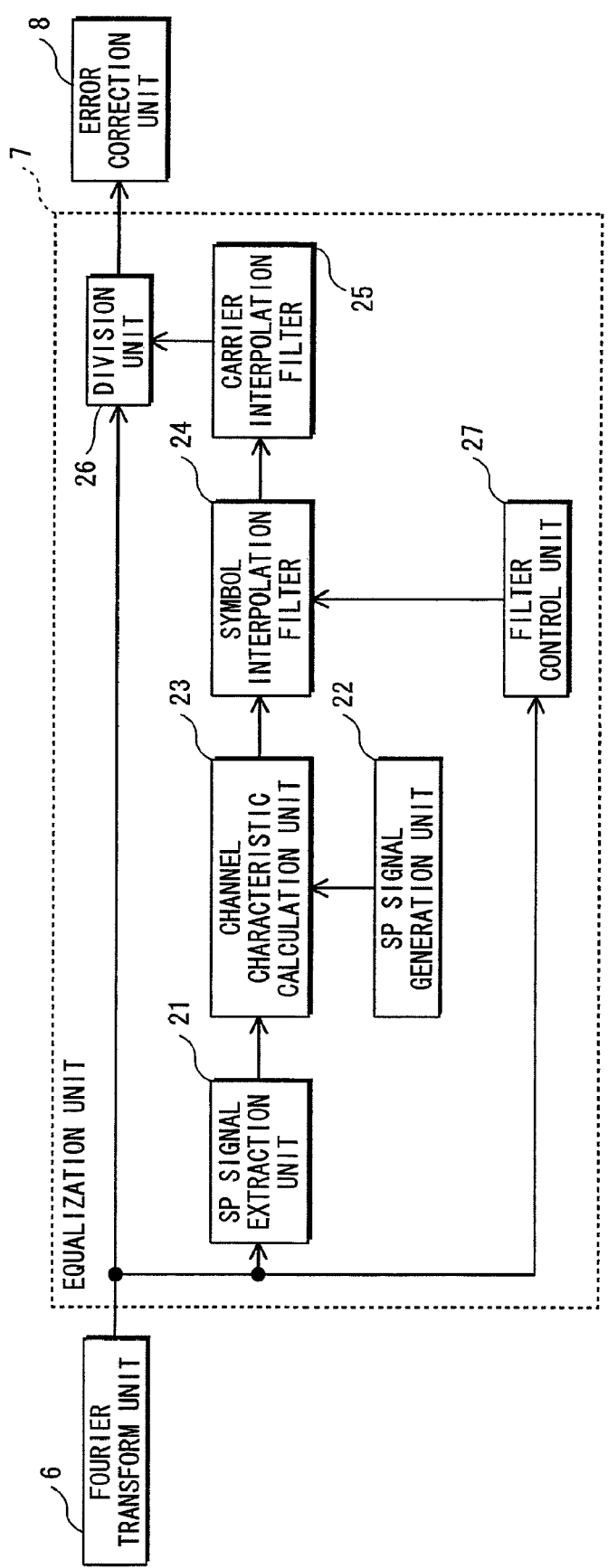
FIG. 4 shows a structure of an equalization unit in FIG. 1.

The structure of the equalization unit 7 in FIG. 1 is described with reference to FIG. 4. FIG. 4 shows the structure of the equalization unit 7 in FIG. 1.

The equalization unit 7 includes an SP signal extraction unit 21, an SP signal generation unit 22, a channel characteristic calculation unit 23, a symbol interpolation filter 24, a carrier interpolation filter 25, a division unit 26, and a filter control unit 27.

The received signals which have been Fourier-transformed by the Fourier transform unit 6 are input to the division unit 26, the SP signal extraction unit 21, and the filter control unit 27.

The SP signal extraction unit 21 extracts SP signals (including the CP signals also acting as SP signals) from the Fourier-transformed received signals input from the Fourier transform unit 6, and outputs the extracted SP signals to the channel characteristic calculation unit 23.

The SP signal generation unit 22 generates, with use of a logic circuit or the like, signals having the same amplitude and phase as the SP signals modulated by the transmitter, and outputs the generated signals to the channel characteristic calculation unit 23.

The SP signal generation unit 23 divides each SP signal input from the SP signal extraction unit 21 by the signal in correspondence thereto input from the SP signal generation unit 22, and outputs the division result to the symbol interpolation filter 24. It should be noted that the division result is the channel characteristics of the position (SP signal position) where each SP signal extracted by the SP signal extraction unit 21 is placed.

The symbol interpolation filter 24 is a filter having a structure according to which frequency transfer characteristics indicating relationship between frequency and transfer characteristics can be frequency-shifted. The shift amount by which the frequency transfer characteristics are frequency-shifted is controlled by the filter control unit 27.

The symbol interpolation filter 24 performs interpolation processing in the symbol direction for each carrier in which the SP signals are arranged, using the channel characteristics of the SP signal positions. This is in order to estimate the channel characteristics of the positions where the data-modulated signals are placed (data-modulated signal positions) in the carriers in which the SP signals are arranged. Note that an exemplary structure of the symbol interpolation filter 24 is described later with reference to FIG. 5.

The carrier interpolation filter 25 performs interpolation processing in the carrier direction for each symbol using the obtained channel characteristics, in order to estimate the channel characteristics of the data-modulated signal positions in the carriers which are other than the carriers including the SP signals.

The division unit 26 (i) divides the data-modulated signals in the received signals input from the Fourier transform unit 6 by the channel characteristics of the positions where the data-modulated signals are arranged, respectively, so as to equalize and demodulate the data-modulated signals, and (ii) outputs the demodulated data-modulated signals to the error correction unit 8.

The filter control unit 27 extracts CP signals from the Fourier-transformed received signals input from the Fourier transform unit 6, and observes temporal variation of the channel characteristics pertaining to the carrier in which the CP signals are arranged. Following that, the filter control unit 27, based on the observation result, determines a shift amount by which to frequency-shift the frequency transfer characteristics of the symbol interpolation filter 24, and outputs to the symbol interpolation filter 24 a frequency control signal notifying the determined shift amount to the symbol interpolation filter 24. Upon receipt of the frequency control signal from the filter control unit 27, the symbol interpolation filter 24 frequency-shifts the frequency transfer characteristics based on the shift amount indicated by the frequency control signal. This is how the filter control unit 27 controls frequency-shifting of the frequency transfer characteristics of the symbol interpolation filter 24. Note that details of the filter control unit 27 are described later with reference to FIG. 6.

<Structure of Symbol Interpolation Filter>

Figure 5:
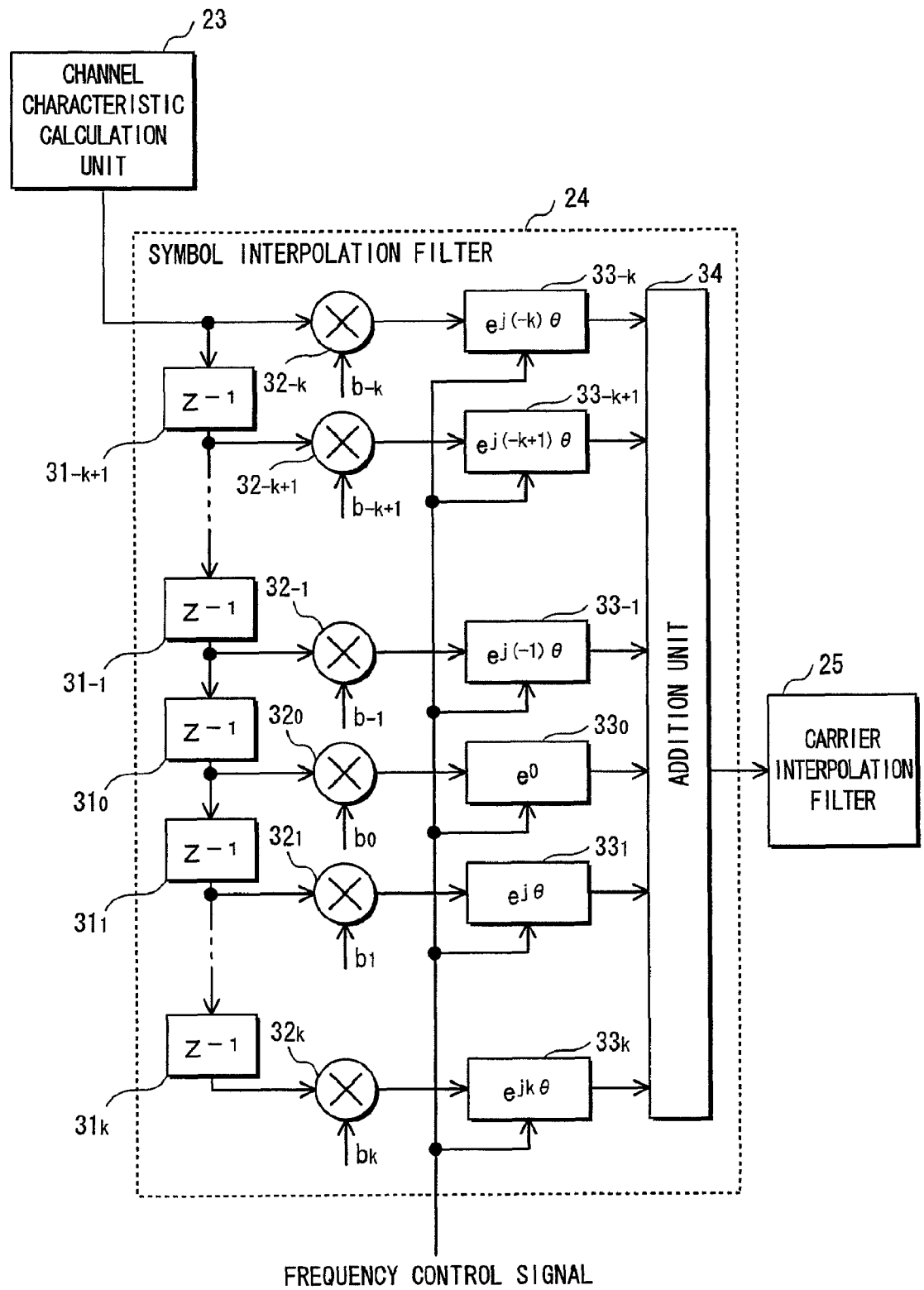
FIG. 5 shows a structure of a symbol interpolation filter in FIG. 4.

The structure of the symbol interpolation filter 24 in FIG. 4 is described with reference to FIG. 5. FIG. 5 shows the structure of the symbol interpolation filter 24 in FIG. 4, which is an example of structuring the symbol interpolation filter 24 using (2k+1)-tap FIR (Finite Impulse Response) type filter. Note that k is a positive integer.

The symbol interpolation filter 24 includes (a) 2 k pieces of delay units $31_{-k+1}, \ldots, 31_{-1}, 31_0, 31_1, \ldots, 31_k$, (b) (2k+1) pieces of multiplication units $32_{-k}, 32_{-k+1}, \ldots, 32_{-1}, 32_0, 32_1, \ldots, 32_k$, (c) (2k+1) pieces of phase rotation units $33_{-k}, 33_{-k+1}, \ldots, 33_{-1}, 33_0, 33_1, \ldots, 33_k$, and (d) an addition unit 34.

The symbol interpolation filter 24 receives, from the channel characteristic calculation unit 23, data indicating channel characteristics once every four symbols and data "0" three times every four symbols.

The delay units $31_{-k+1}, \ldots, 31_{-1}, 31_0, 31_1, \ldots, 31_k$ each delay the input data by one symbol.

The data output from the delay units $31_{-k+1}, 31_{-1}, 31_0, 31_1, \ldots, 31_k$ is the data, which has been input from the symbol interpolation filter 24, delayed by 1 symbol, ..., (k−1) symbols, k symbols, (k+1) symbols, ..., 2k symbols.

The multiplication units $32_{-k}, 32_{-k+1}, \ldots, 32_{-1}, 32_0, 32_1, \ldots, 32_k$ each multiply the input data with coefficients $b_{-k}, b_{-k+1}, \ldots, b_{-1}, b_0, b_1, \ldots, b_k$, respectively, and output the multiplication result to the phase rotation units $33_{-k}, 33_{-k+1}, \ldots, 33_{-1}, 33_0, 33_1, \ldots, 33_k$, respectively.

The phase rotation units $33_{-k}, 33_{-k+1}, \ldots, 33_{-1}, 33_0, 33_1, \ldots, 33_k$ each multiply the input data with $e^{j(-k)\theta}, e^{j(-k+1)\theta}, \ldots, e^{j(-1)\theta}, e^0, e^{j\theta}, \ldots, e^{jk\theta}$, respectively, thereby rotating the phases of the input data by −kθ radians, (−k+1)θ radians, ..., −θ radians, 0 radian, θ radians, ..., kθ radians. After that, the phase rotation units $33_{-k}, 33_{-k+1}, \ldots, 33_{-1}, 33_0, 33_1, \ldots, 33_k$ each output the phase-rotated data to the addition unit 34. The symbol interpolation filter 24 receives a frequency control signal indicating the value of θ from the filter control unit 27, and the value of θ indicated by the frequency control signal is set to each of the phase rotation units $33_{-k}, 33_{-k+1}, \ldots, 33_{-1}, 33_0, 33_1, \ldots, 33_k$.

The addition unit 34 adds the data input from the phase rotation units $33_{-k}, 33_{-k+1}, \ldots, 33_{-1}, 33_0, 33_1, \ldots, 33_k$, and outputs the addition result as the channel characteristics to the carrier interpolation filter 25.

The above-described symbol interpolation filter 24 is composed of a general digital filter to which the phase rotation units $33_{-k}, 33_{-k+1}, \ldots, 33_{-1}, 33_0, 33_1, \ldots, 33_k$ are added.

The symbol interpolation filter 24 determines the frequency transfer characteristics of the symbol interpolation filter 24 when the value of θ is 0, using the coefficients $b_{-k}, b_{-k+1}, \ldots, b_{-1}, b_0, b_1, \ldots, b_k$.

It should be noted that when the symbol cycle is T seconds, the passband width according to the frequency transfer characteristics of the symbol interpolation filter 24 is 1/(4T) hertz at maximum since each SP signal is arranged once every four symbols in the symbol direction. Accordingly, the values of the coefficients $b_{-k}, b_{-k+1}, \ldots, b_{-1}, b_0, b_1, \ldots, b_k$ are set such that the passband width according to the frequency transfer characteristics of the symbol interpolation filter 24 is 1/(4T) hertz or less.

In addition, the shift amount by which the frequency transfer characteristics of the symbol interpolation filter 24 is frequency-shifted is determined according to θ and the symbol cycle. For example, when the frequency control signal input from the filter control unit 27 indicates $\theta_0$ radians with the symbol cycle being T seconds, the shift amount by which to frequency-shift the frequency transfer characteristics of the symbol interpolation filter 24 is $\theta_0/(2\pi T)$ hertz.

It should be noted that since no phase rotation occurs at the phase rotation unit $33_0$, the symbol interpolation filter 24 can be structured such that output from the multiplication unit $32_0$ is directly input to the addition unit 34.

<Structure of Filter Control Unit>

Figure 6:
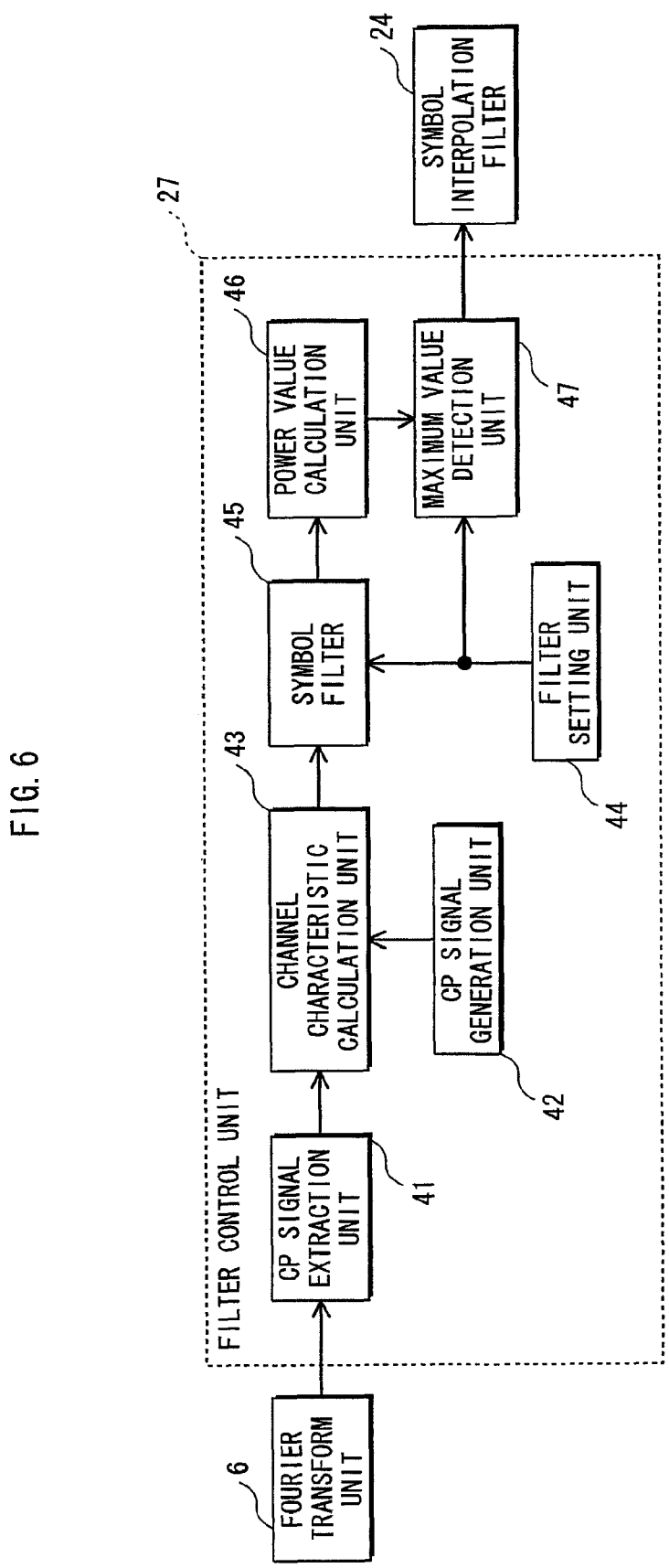
FIG. 6 shows a structure of a filter control unit in FIG. 4.

The structure of the filter control unit 27 in FIG. 4 is described with reference to FIG. 6. FIG. 6 shows the structure of the filter control unit 27 in FIG. 4.

The filter control unit 27 includes a CP signal extraction unit 41, a CP signal generation unit 42, a channel characteristic calculation unit 43, a filter setting unit 44, a symbol filter 45, a power value calculation unit 46, and a maximum value detection unit 47.

The received signals which have been Fourier-transformed by the Fourier transform unit 6 are input to the CP signal extraction unit 41.

The CP extraction unit 41 extracts CP signals from the received signals Fourier-transformed by the Fourier transform unit 6, and outputs the extracted CP signals to the channel characteristic calculation unit 43.

The CP signal generation unit 42 generates, with use of a logic circuit or the like, signals having the same amplitude and phase to the CP signals modulated by the transmitter, and outputs the generated signals to the channel characteristic calculation unit 43.

The channel characteristic calculation unit 43 divides each CP signal input from the CP signal extraction unit 41 by the signal in correspondence thereto input from the CP signal generation unit 42, and outputs the division result to the symbol filter 45. It should be noted that the division result is channel characteristics of the position (hereinafter, referred to as "CP signal positions") where each CP signal extracted by the CP signal extraction unit 41 is arranged.

The filter setting unit 44 outputs, to the symbol filter 45 and the maximum value detection unit 47, filter setting information indicating a value of θ that corresponds to the shift amount by which to frequency-shift the frequency transfer characteristics of the symbol filter 45. It should be noted that the filter setting unit 44 outputs the filter setting information to the symbol filter 45 and the maximum value detection unit 47, while sequentially changing the value of θ indicated by the filter setting information.

The symbol filter 45 is capable of realizing the same frequency transfer characteristics as the frequency transfer characteristics of the symbol interpolation filter 24 and is structured to be capable of frequency-shifting the frequency transfer characteristics, and the shift amount by which to frequency-shift the frequency transfer characteristics is set by the filter setting unit 44.

The symbol filter 45 of the present embodiment has the same structure as that of the symbol interpolation filter 24. The values set to the coefficients $b_{-k}, b_{-k+1}, \ldots, b_{-1}, b_0, b_1, \ldots, b_k$ of the symbol interpolation filter 24 each are set to the value of coefficients $b_{-k}, b_{-k+1}, \ldots, b_{-1}, b_0, b_1, \ldots, b_k$ of the symbol filter 45.

Additionally, the value indicated by the filter setting information input from the filter setting unit 44 is set to θ of the phase rotation units $33_{-k}, 33_{-k+1}, \ldots, 33_{-1}, 33_0, 33_1, \ldots, 33_k$ of the symbol filter 45.

The symbol filter 45 filters the channel characteristics input from the channel characteristic calculation unit 43 and outputs the filtered channel characteristics to the power value calculation unit 46.

It should be noted that since the channel characteristic calculation unit 43 calculates channel characteristics with respect to the CP signals appearing in each symbol, the symbol filter 45 receives data indicating the channel characteristics every symbol.

The power value calculation unit 46 calculates the power value of each of the output signals (result of the filtering by the symbol filter 45) of the symbol filter 45 and outputs the calculation result to the maximum value detection unit 47.

The maximum value detection unit 47 observes the output signals from the power value calculation unit 46 (power value calculated by the power value calculation unit 46) and detects the maximum value among the output signals. The maximum value detection unit 47 then outputs to the symbol interpolation filter 24 the frequency control signal indicating the value of θ which is indicated, when the output signal from the power value calculation unit 46 is the maximum value, by the filter setting information input from the filter setting unit 44. Upon reception of the frequency control signal from the maximum value detection unit 47 in the filter control unit 27, the symbol interpolation filter 24 sets the value of θ of each phase rotation unit in the symbol interpolation filter 24 to the value indicated by the frequency control signal, and frequency-shifts the frequency transfer characteristics. After that, the symbol interpolation filter 24 filters the channel characteristics input from the channel characteristic calculation unit 23, based on the frequency-shifted frequency transfer characteristics, and outputs the filtered channel characteristics to the carrier interpolation filter 25.

<Operations of Filter Control Unit>

Figure 7:
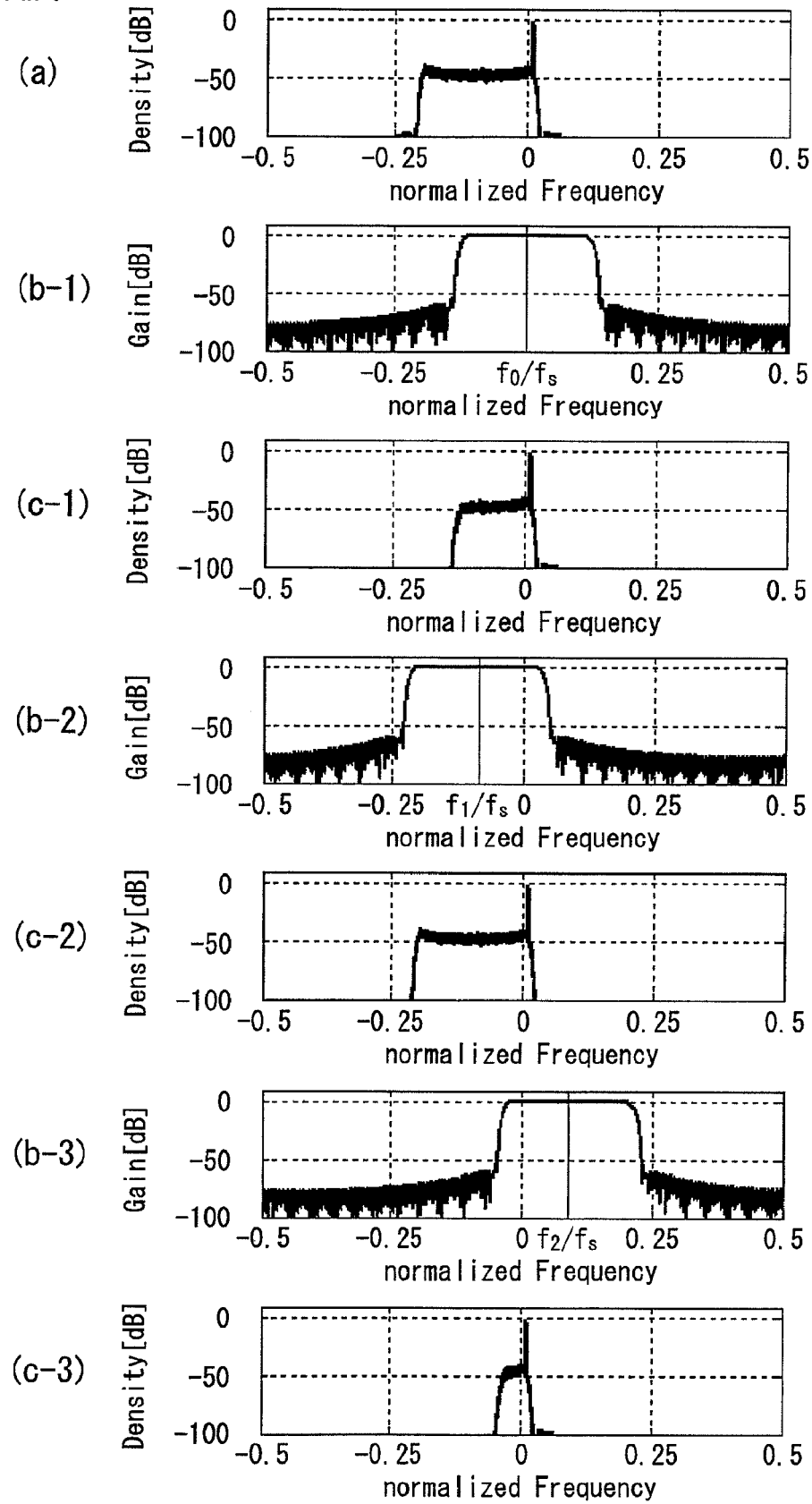
FIGS. 7(*a*) to (C-3) are diagrams for explaining operations of the filter control unit in FIG. 6.

The following describes operations of the filter control unit 27 in FIG. 6 with reference to FIGS. 7(a) to (C-3). FIGS. 7(a) to (C-3) are diagrams for explaining operations of the filter control unit 27 in FIG. 6. Note that in each of FIGS. 7(a) to (c-3), the horizontal axis indicates a frequency normalized by a symbol frequency $f_s$. In FIGS. 7 (a), (c-1), (c-2), and (c-3), the vertical axis indicates spectral density, while in FIGS. 7(b-1), (b-2), and (b-3), the vertical axis indicates gain (dB). Note that the symbol frequency $f_s$=1/T hertz, where the symbol cycle is T seconds.

FIG. 7(a) indicates, in terms of the spectral density, temporal variation of the channel characteristics observed based on the CP signals. That is to say, FIG. 7(a) indicates the spectral density of the channel characteristics input from the channel characteristic calculation unit 43 to the symbol filter 45. It should be noted that since a CP signal is transmitted in each symbol, an aliasing component appears in cycles of the symbol frequency $f_s$. For that reason, no aliasing component appears in FIG. 7(a) which indicates only a portion corresponding to the symbol frequency $f_s$.

When the passband width of the frequency transfer characteristics is, for instance, 1/(4T) hertz that is the maximum allowed based on the sampling theorem of complex signals, detection of the maximum value among power values of the output signals of the symbol filter 45 while the frequency transfer characteristics being frequency-shifted can be performed without including an aliasing component.

First, the filter setting unit 44 outputs, to the symbol filter 45 and the maximum value detection unit 47, the filter setting information which assigns $2\pi f_0/f_s$ (radians) as the value of θ so as to set, to $f_0$, the shift amount by which to frequency-shift the frequency transfer characteristics (hereinafter, referred to as "frequency shift amount of the frequency transfer characteristics") of the symbol filter 45.

The symbol filter 45 sets the value of θ of each phase rotation unit in the symbol filter 45 to $2\pi f_0/f_s$ (radians) indicated by the filter setting information in accordance with the filter setting information input from the filter setting unit 44, thereby frequency-shifting the frequency transfer characteristics by the frequency $f_0$. FIG. 7(b-1) shows the frequency transfer characteristics of the symbol filter 45, which has been frequency-shifted by the frequency $f_0$.

The channel characteristics whose spectral density is shown in FIG. 7(a) is filtered by the symbol filter 45 whose frequency transfer characteristics are shown in FIG. 7(b-1). The spectral density of the channel characteristics filtered by the symbol filter 45 is as shown in FIG. 7(c-1).

The power value calculation unit 46 calculates the power value of each of the output signals of the symbol filter 45, that is, the power value of the channel characteristics whose spectral density is shown in FIG. 7(c-1), and outputs the calculated power value to the maximum value detection unit 47. The maximum value detection unit 47 holds, as $\theta_{max}$, the value $(2\pi f_0/f_s)$ of θ indicated by the filter setting information input from the filter setting unit 44, and holds, as $p_{max}$, the power value input from the power value calculation unit 46.

Subsequently, the filter setting unit 44 outputs, to the symbol filter 45 and the maximum value detection unit 47, the filter setting information which assigns $2\pi f_1/f_s$ (radians) as the value of θ so as to set the frequency shift amount of the frequency transfer characteristics of the symbol filter 45 to $f_1$.

The symbol filter 45 sets the value of θ of each phase rotation unit in the symbol filter 45 to $2\pi f_1/f_s$ (radians) indicated by the filter setting information, thereby frequency-shifting the frequency transfer characteristics by the frequency $f_1$. FIG. 7(b-2) shows the frequency transfer characteristics of the symbol filter 45 frequency-shifted by the frequency $f_1$.

The channel characteristics whose spectral density is shown in FIG. 7(a) is filtered by the symbol filter 45 whose frequency transfer characteristics are shown in FIG. 7(b-2). The spectral density of the channel characteristics filtered by the symbol filter 45 is as shown in FIG. 7(c-2).

The power value calculation unit 46 calculates the power value of each of the output signals of the symbol filter 45, that is, the power value of the channel characteristics whose spectral density is shown in FIG. 7(c-2), and outputs the calculated power value to the maximum value detection unit 47. The maximum value detection unit 47 compares the power value input from the power value calculation unit 46 and the value of $p_{max}$ held therein, and in this case, judges that the power value input from the power value calculation unit 46 is larger than the value of $p_{max}$. The maximum value detection unit 47 holds, as $\theta_{max}$, the value $(2\pi f_1/f_s)$ of θ indicated by the filter setting information input from the filter setting unit 44 and holds, as $p_{max}$, the power value input from the power value calculation unit 46.

Following that, the filter setting unit 44 outputs, to the symbol filter 45 and the maximum value detection unit 47, the filter setting information which assigns $2\pi f_2/f_s$ (radians) as the value of θ so as to set the frequency shift amount of the frequency transfer characteristics of the symbol filter 45 to $f_2$.

The symbol filter 45 sets the value of θ of each phase rotation unit in the symbol filter 45 to $2\pi f_2/f_s$ (radians) indicated by the filter setting information, thereby frequency-shifting the frequency transfer characteristics by the frequency $f_2$. FIG. 7(b-3) shows the frequency transfer characteristics of the symbol filter 45 frequency-shifted by the frequency $f_2$.

The channel characteristics whose spectral density is shown in FIG. 7(a) is filtered by the symbol filter 45 whose frequency transfer characteristics are shown in FIG. 7(b-3). The spectral density of the channel characteristics filtered by the symbol filter 45 is as shown in FIG. 7(c-3).

The power value calculation unit 46 calculates the power value of each of the output signals of the symbol filter 45, that is, the power value of the channel characteristics whose spectral density is shown in FIG. 7(c-3), and outputs the calculated power value to the maximum value detection unit 47. The maximum value detection unit 47 compares the power value input from the power value calculation unit 46 and the value of $p_{max}$ held therein, and in this case, judges that the power value input from the power value calculation unit 46 is smaller than the value of $p_{max}$. The maximum value detection unit 47 keeps $2\pi f_1/f_s$ as $\theta_{max}$ and keeps the value of $p_{max}$.

Following that, the maximum value detection unit 47 outputs, to the symbol interpolation filter 24, the frequency control signal indicating, as the value of $\theta$, $2\pi f_1/f_s$ indicated by $\theta_{max}$.

The symbol interpolation filter 24 sets the value of $\theta$ of each phase rotation unit in the symbol interpolation filter 24 to $2\pi f_1/f_s$ indicated by the frequency control signal. The frequency transfer characteristics of the symbol interpolation filter 24 become equivalent to that shown in FIG. 7(b-2).

It should be noted that while the above describes three frequency shift amounts $f_0$, $f_1$, and $f_2$, the number of the frequency shift amounts is not limited to these.

<Operations of Receiver>

The operations of the receiver 1 explained with reference to FIGS. 1 to 7 are explained in the following with reference to FIGS. 8(a) to (g). FIGS. 8(a) to (g) are diagrams for explaining operations of the receiver 1 of the first embodiment.

It should be noted that FIGS. 8(a) to (g) shows a case where under the Rice fading environment in which specular waves and scattered waves are received at the same time, the specular waves arrive from the front in the moving direction of the receiver and are accompanied by Doppler frequency shifting. Note that the scattered waves are assumed to arrive evenly from all directions.

In each of FIGS. 8(a) to (g), the horizontal axis indicates a frequency normalized by the symbol frequency $f_s$. In FIGS. 8(a) to (c) and (e) to (g), the vertical axis indicates the spectral density (dB), while in FIG. 8(d), the vertical axis indicates the gain (dB). Note that the symbol frequency $f_s=1/T$ hertz, where the symbol cycle is T seconds.

FIG. 8(a) shows, in terms of the spectral density in equivalent low-frequency, temporal variation of channel characteristics under a Rice fading environment where the specular waves arrive from the front in the moving direction of the receiver 1. In FIG. 8(a), S represents a specular wave component, and D (in the oval) represents a scattered wave component. The scattered wave component D is distributed from $-f_{Dmax}$ to $+f_{Dmax}$ with the maximum Doppler frequency being $+f_{Dmax}$. The specular wave component S arriving from the front in the moving direction shifts in frequency to $+f_{Dmax}$. It should be noted that specular wave components arriving from behind in the moving direction shifts in frequency to $-f_{Dmax}$.

FIG. 8(b) shows, in terms of the spectral density, temporal variation of the channel characteristics observed based on the received signals output from the AFC unit 4. When the received power of the specular wave component S is larger than that of the scattered wave component D, the AFC unit 4 regards the Doppler frequency shifting as a frequency error of the received signals and performs frequency control to eliminate the frequency error of the received signals. This way, the received signals input to the AFC unit 103 are frequency-shifted such that, of the spectral density of the channel characteristics observed based on the received signals output from the AFC unit 103, the specular wave component S comes close to a direct current (frequency is 0). The AFC unit 4 frequency-shifts the channel characteristics of the received signals in a virtual manner.

FIG. 8(c) shows, in terms of the spectral density, temporal variation of channel characteristics observed based on the SP signals included in the received signals input from the AFC unit 4 to the equalization unit 7 via the Fourier transform unit 6. In the DVB-T system, as shown in FIG. 3, the SP signal are placed once every four symbols in the symbol direction. Accordingly, in the channel characteristics observed at the SP signal positions, aliasing occurs in cycles of ¼ of the symbol frequency $f_s$ (=$f_s/4$).

FIG. 8(d) shows the frequency transfer characteristics of the symbol interpolation filter 24, the frequency shift amount of the frequency transfer characteristics being controlled by processing by the filter control unit 27, as described with reference to FIG. 7. The symbol interpolation filter 24 estimates the channel characteristics of the received signals output from the AFC unit 4 shown in FIG. 8(b) by filtering the channel characteristics observed at the SP signal positions shown in FIG. 8(c).

FIG. 8(e) shows, in terms of the spectral density, channel characteristics obtained by filtering, by the symbol interpolation filter 24, desired channel characteristics components (channel characteristics with respect to the received signals output from the AFC unit 4 shown in FIG. 8(b)) among the channel characteristics observed at the SP signal positions shown in FIG. 8(c).

Figure 19:
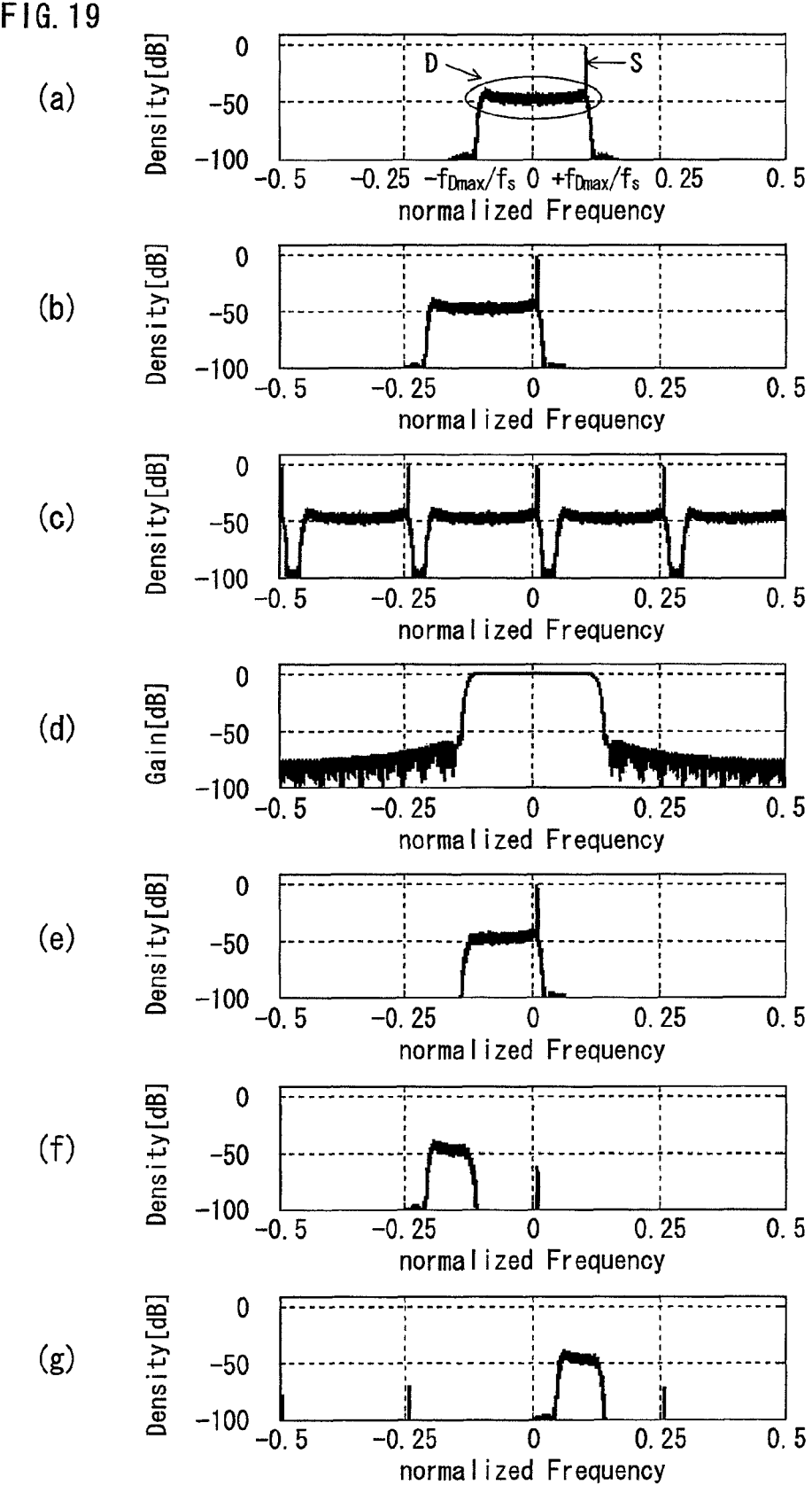
FIGS. 19(a) to (g) are diagrams for explaining operations of the conventional receiver.

FIG. 8(f) shows, in terms of the spectral density, channel characteristic components blocked by filtering, by the symbol interpolation filter 24, the desired channel characteristics components among the channel characteristics observed at the SP signal positions shown in FIG. 8(c). It is obvious from FIGS. 8(e), (f), and also from FIGS. 19(e) and (f), which show a conventional case, that the components missing from the desired channel characteristics are smaller compared to those in the conventional cases.

FIG. 8(g) shows, in terms of the spectral density, channel characteristics obtained by filtering, by the symbol interpolation filter 24, channel characteristic components due to aliasing (the channel characteristics observed at the SP signals shown in FIG. 8(c), excluding the desired channel characteristics shown in FIG. 8(b)) among the channel characteristics observed at the SP signal positions shown in FIG. 8(c). From FIG. 8(g) and the conventional case shown in FIG. 19(g), the aliasing components output from the symbol interpolation filter 24 are smaller compared to those in the conventional case.

As described above, the components shown in FIGS. 8 (f) and (g) are smaller compared to those in the conventional case, and thus, error in estimation of the channel characteristics of the data-modulated signal positions becomes smaller, reducing the error in the demodulation by the equalization unit 7.

It should be noted that under a propagation environment where multiple specular waves are received simultaneously such as a multipath propagation environment where reflective waves include specular waves or a SFN (Single Frequency Network) environment which uses multipath resistance of the OFDM transmission system, the same effects as those under the Rice fading environment can be achieved.

Second Embodiment

The following describes the second embodiment of the present invention with reference to the drawings.

In the present embodiment, while a filter control unit 27a which controls frequency-shifting of the frequency transfer characteristics of the symbol interpolation filter 24 differs from the filter control unit 27 in the first embodiment, other components are substantially the same as those in the first embodiment.

<Structure of Filter Control Unit>

Figure 9:
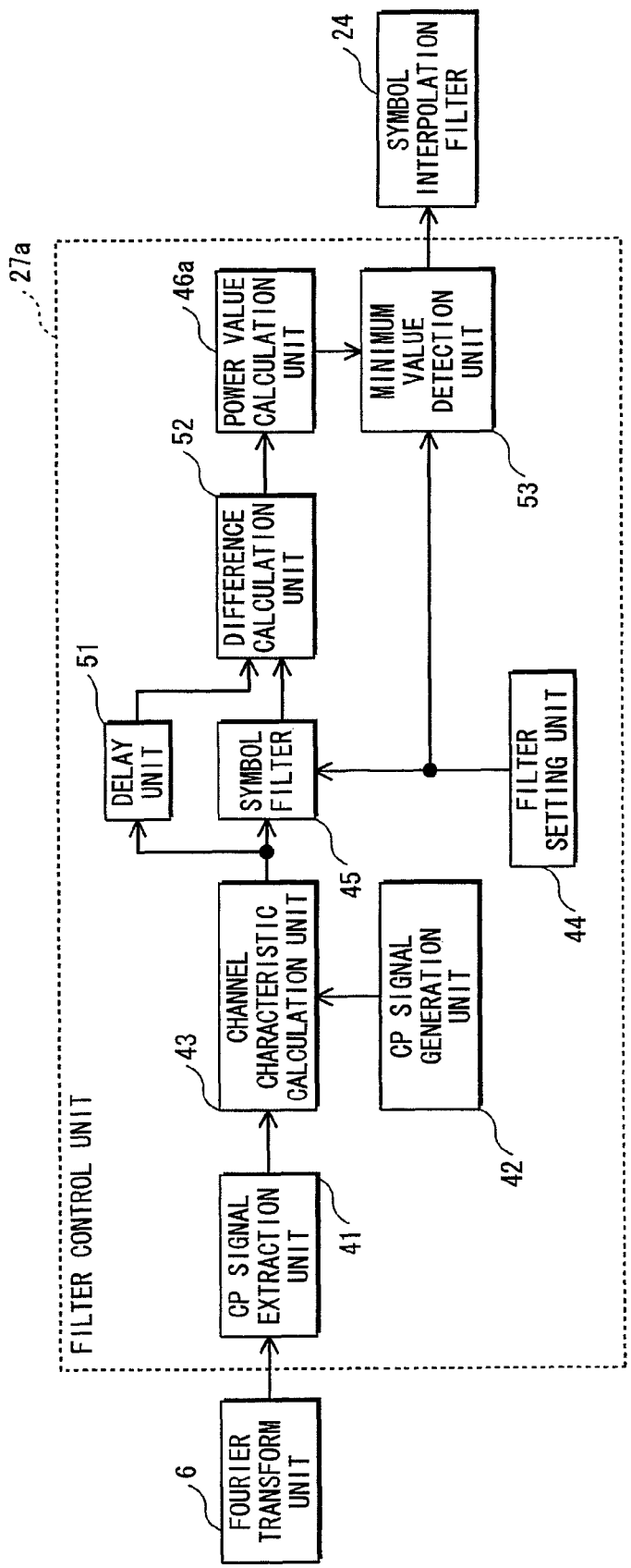
FIG. 9 shows a structure of a filter control unit of a second embodiment.

The structure of the filter control unit 27a of the present embodiment is described with reference to FIG. 9. FIG. 9 shows the structure of the filter control unit 27a of the second embodiment. Note that in the present embodiment, the structure components having the substantially same function as that in the first embodiment are assigned the same reference numbers as those in the first embodiment, and their description is omitted since the description in the first embodiment can be applied.

The filter control unit 27a includes the CP signal extraction unit 41, the CP signal generation unit 42, the channel characteristic calculation unit 43, the filter setting unit 44, the symbol filter 45, a delay unit 51, a difference calculation unit 52, a power value calculation unit 46a, and a minimum value detection unit 53.

The delay unit 51 delays the signals input from the channel characteristic calculation unit 43 and outputs the delayed signals to the difference calculation unit 52 in a manner that the time required for the output signals of the channel characteristic calculation unit 43 to be input to the difference calculation unit 52 via the symbol filter 45 and the time required for those signals to be input to the difference calculation unit 52 via the delay unit 51 are the same.

The difference calculation unit 52 calculates the difference between each of the input signals input from the symbol filter 45 (filtering result by the symbol filter 45) and the corresponding input signal input from the delay unit 51, and outputs the calculated difference value to the power value calculation unit 46a.

The power value calculation unit 46a calculates the power value of each of the output signals of the difference calculation unit 52 (difference values calculated by the difference calculation unit 52) and outputs the calculation result to the minimum value detection unit 53.

The minimum value detection unit 53 observes the output signals of the power value calculation unit 46a (power values calculated by the power value calculation unit 46a) and detects the minimum value among these output signals. After that, the minimum value detection unit 53 outputs to the symbol interpolation filter 24 the frequency control signal indicating the value of θ which is indicated, when the output signal from the power value calculation unit 46a is the minimum value, by the filter setting information input from the filter setting unit 44. Upon reception of the frequency control signal from the minimum value detection unit 53 in the filter control unit 27a, the symbol interpolation filter 24 sets the value of θ of each phase rotation unit in the symbol interpolation filter 24 to the value indicated by the frequency control signal, thereby frequency-shifting the frequency transfer characteristics. After that, the symbol interpolation filter 24 filters the channel characteristics input from the channel characteristic calculation unit 23, in accordance with the frequency-shifted frequency transfer characteristics, and outputs the filtered channel characteristics to the carrier interpolation filter 25.

<Operations of Filter Control Unit>

Figure 10:
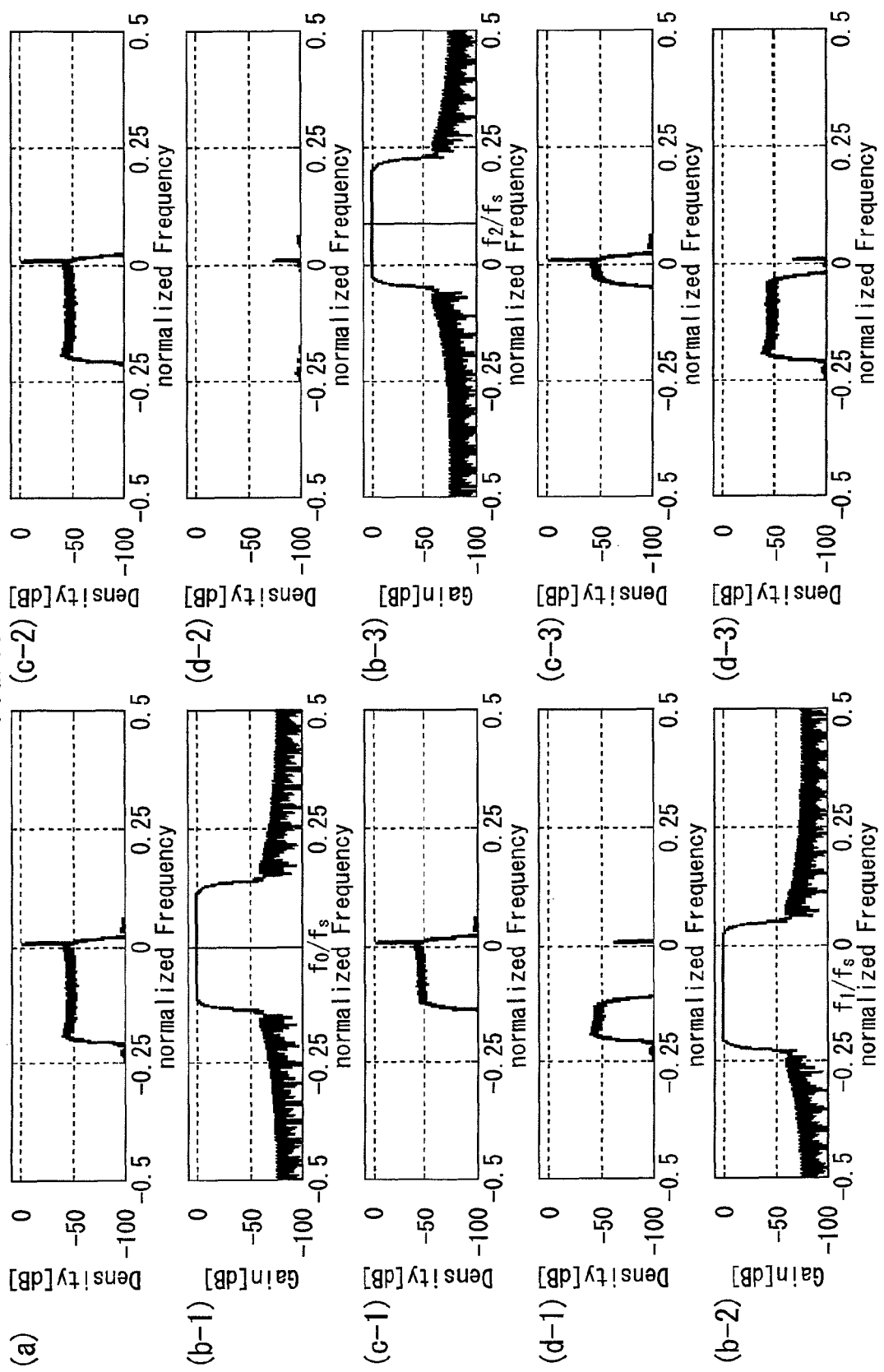
FIGS. 10(*a*) to (*d*-3) are diagrams for explaining operations of the filter control unit in FIG. 9.

The following describes operations of the filter control unit 27a in FIG. 9 with reference to FIGS. 10. FIGS. 10(a) to (d-3) are diagrams for explaining operations of the filter control unit 27a in FIG. 9. Note that in each of FIGS. 10(a) to (d-3), the horizontal axis indicates a frequency normalized by the symbol frequency $f_s$. In FIGS. 10 (a), (c-1), (d-1), (c-2), (d-2), (c-3) and (d-3), the vertical axis indicates the spectral density, while in FIGS. 10(b-1), (b-2), and (b-3), the vertical axis indicates the gain (dB). Note that the symbol frequency $f_s$=1/T hertz, where the symbol cycle is T seconds.

FIG. 10(a) indicates, in terms of the spectral density, temporal variation of the channel characteristics observed based on the CP signals. That is to say, FIG. 10(a) indicates the spectral density of the channel characteristics input from the channel characteristic calculation unit 43 to the symbol filter 45. It should be noted that since a CP signal is transmitted in each symbol, an aliasing component appears in cycles of the symbol frequency $f_s$. For that reason, no aliasing component appears in FIG. 10(a) which indicates only a portion corresponding to the symbol frequency $f_s$.

First, the filter setting unit 44 outputs, to the symbol filter 45 and the minimum value detection unit 43, the filter setting information which indicates $2\pi f_0/f_s$ (radians) as the value of θ so as to set, to $f_0$, the shift amount (the frequency shift amount of the frequency transfer characteristics) by which the frequency transfer characteristics of the symbol filter 45 are frequency-shifted.

The symbol filter 45 sets, in accordance with the filter setting information input from the filter setting unit 44, the value of θ of each phase rotation unit in the symbol filter 45 to $2\pi f_0/f_s$ (radians) indicated by the filter setting information, thereby frequency-shifting the frequency transfer characteristics by the frequency $f_0$. FIG. 10(b-1) shows the frequency transfer characteristics of the symbol filter 45, which has been frequency-shifted by the frequency $f_0$.

The channel characteristics whose spectral density is shown in FIG. 10(a) is filtered by the symbol filter 45 whose frequency transfer characteristics are shown in FIG. 10(b-1). The spectral density of the channel characteristics filtered by the symbol filter 45 is as shown in FIG. 10(c-1).

The difference calculation unit 52 calculates the difference between each of the input signals from the symbol filter 45 (signals with respect to the channel characteristics whose spectral density is shown in FIG. 10(c-1)) and the corresponding input signal from the delay unit 51 (signal having the same spectral density as that shown in FIG. 10(a)), and outputs the calculation result as the output signal to the power value calculation unit 46a. The spectral density of the output signals of the difference calculation unit 52 is as shown in FIG. 10(d-1).

The power value calculation unit 46a calculates the power value of each of the output signals of the difference calculation unit 52, that is, the power value of the channel characteristics whose spectral density is shown in FIG. 10(d-1), and outputs the calculated power value to the minimum value detection unit 53. The minimum value detection unit 53 holds, as $\theta_{min}$, the value $(2\pi f_0/f_s)$ of θ indicated by the filter setting information input from the filter setting unit 44, and holds, as $p_{min}$, the power value input from the power value calculation unit 46a.

Subsequently, the filter setting unit 44 outputs, to the symbol filter 45 and the minimum value detection unit 53, the filter setting information which assigns $2\pi f_1/f_s$ (radians) as the value of θ so as to set the frequency shift amount of the frequency transfer characteristics of the symbol filter 45 to $f_1$.

The symbol filter 45 sets, in accordance with the filter setting information input from the filter setting unit 44, the value of θ of each phase rotation unit in the symbol filter 45 to $2\pi f_1/f_s$ (radians) indicated by the filter setting information, thereby frequency-shifting the frequency transfer characteristics by the frequency $f_1$. FIG. 10(b-2) shows the frequency transfer characteristics of the symbol filter 45 frequency-shifted by the frequency $f_1$.

The channel characteristics whose spectral density is shown in FIG. 10(a) is filtered by the symbol filter 45 whose frequency transfer characteristics are shown in FIG. 10(b-2). The spectral density of the channel characteristics filtered by the symbol filter 45 is as shown in FIG. 10(c-2).

The difference calculation unit 52 calculates the difference between each of the input signals from the symbol filter 45 (signal with respect to the channel characteristics whose spectral density is shown in FIG. 10(c-2)) and the corresponding input signal from the delay unit 51 (signal having the same spectral density as that shown in FIG. 10(a)), and outputs the calculation result as the output signal to the power value calculation unit 46a. The spectral density of the output signals of the difference calculation unit 52 is as shown in FIG. 10(d-2).

The power value calculation unit 46a calculates the power value of each of the output signals of the difference calculation unit 52, that is, the power value of the channel characteristics whose spectral density is shown in FIG. 10(d-2), and outputs the calculated power value to the minimum value detection unit 53. The minimum value detection unit 53 compares the power value input from the power value calculation unit 46a and the value of $p_{min}$ held therein, and in this case, judges that the power value input from the power value calculation unit 46a is smaller than the value of $p_{min}$. The minimum value detection unit 53 holds, as $\theta_{min}$, the value $(2\pi f_1/f_s)$ of θ indicated by the filter setting information input from the filter setting unit 44, and holds, as $p_{min}$, the power value input from the power value calculation unit 46a.

Following that, the filter setting unit 44 outputs, to the symbol filter 45 and the minimum value detection unit 53, the filter setting information which assigns $2\pi f_2/f_s$ (radians) as the value of θ so as to set the frequency shift amount of the frequency transfer characteristics of the symbol filter 45 to $f_2$.

The symbol filter 45 sets, in accordance with the filter setting information input from the filter setting unit 44, the value of θ of each phase rotation unit in the symbol filter 45 to $2\pi f_2/f_s$ (radians) indicated by the filter setting information, thereby frequency-shifting the frequency transfer characteristics by the frequency $f_2$. FIG. 10(b-3) shows the frequency transfer characteristics of the symbol filter 45 frequency-shifted by the frequency $f_2$.

The channel characteristics whose spectral density is shown in FIG. 10(a) is filtered by the symbol filter 45 whose frequency transfer characteristics are shown in FIG. 10(b-3). The spectral density of the channel characteristics filtered by the symbol filter 45 is as shown in FIG. 10(c-3).

The difference calculation unit 52 calculates the difference between each of the input signals from the symbol filter 45 (signal with respect to the channel characteristics whose spectral density is shown in FIG. 10(c-3)) and the corresponding input signal from the delay unit 51 (signal having the same spectral density as that shown in FIG. 10(a)), and outputs the calculation result as the output signal to the power value calculation unit 46a. The spectral density of the output signals of the difference calculation unit 52 is as shown in FIG. 10(d-3).

The power value calculation unit 46a calculates the power value of each of the output signals of the difference calculation unit 52, that is, the power value of the channel characteristics whose spectral density is shown in FIG. 10(d-3), and outputs the calculated power value to the minimum value detection unit 53. The minimum value detection unit 53 compares the power value input from the power value calculation unit 46a and the value of $p_{min}$ held therein, and in this case, judges that the power value input from the power value calculation unit 46a is larger than the value of $p_{min}$. The minimum value detection unit 53 keeps $2\pi f_1/f_s$ as $\theta_{min}$ and keeps the value of $p_{min}$.

Following that, the minimum value detection unit 53 outputs, to the symbol interpolation filter 24, the frequency control signal indicating, as the value of θ, $2\pi f_1/f_s$ indicated by $\theta_{min}$.

The symbol interpolation filter 24 sets the value of θ of each phase rotation unit in the symbol interpolation filter 24 to $2\pi f_1/f_s$ indicated by the frequency control signal. The frequency transfer characteristics of the symbol interpolation filter 24 become equivalent to that shown in FIG. 10(b-2).

It should be noted that while the above describes the three frequency shift amounts $f_0$, $f_1$, and $f_2$, the number of the frequency shift amounts is not limited to these.

Third Embodiment

The following describes the third embodiment of the present invention with reference to the drawings.

In the present embodiment, while a filter control unit 27b which controls frequency-shifting of the frequency transfer characteristics of the symbol interpolation filter 24 differs from the filter control unit 27 in the first embodiment, the other components are substantially the same as those in the first embodiment.

The filter control unit 27 in the first embodiment calculates channel characteristics of each symbol using CP signals included in the received signals which having been Fourier-transformed, and controls the frequency-shifting of the frequency transfer characteristics of the symbol interpolation filter 24 using the calculated channel characteristics.

On the other hand, the filter control unit 27b of the present embodiment calculates channel characteristics of each symbol using TMCC (Transmission and Multiplexing Configuration Control) signals included in the Fourier-transformed received signals, and controls the frequency-shifting of the frequency transfer characteristics of the symbol interpolation filter 24 using the calculated channel characteristics.

<Signal Arrangement of Scattered Pilot Signals and TMCC Signals>

Figure 11:
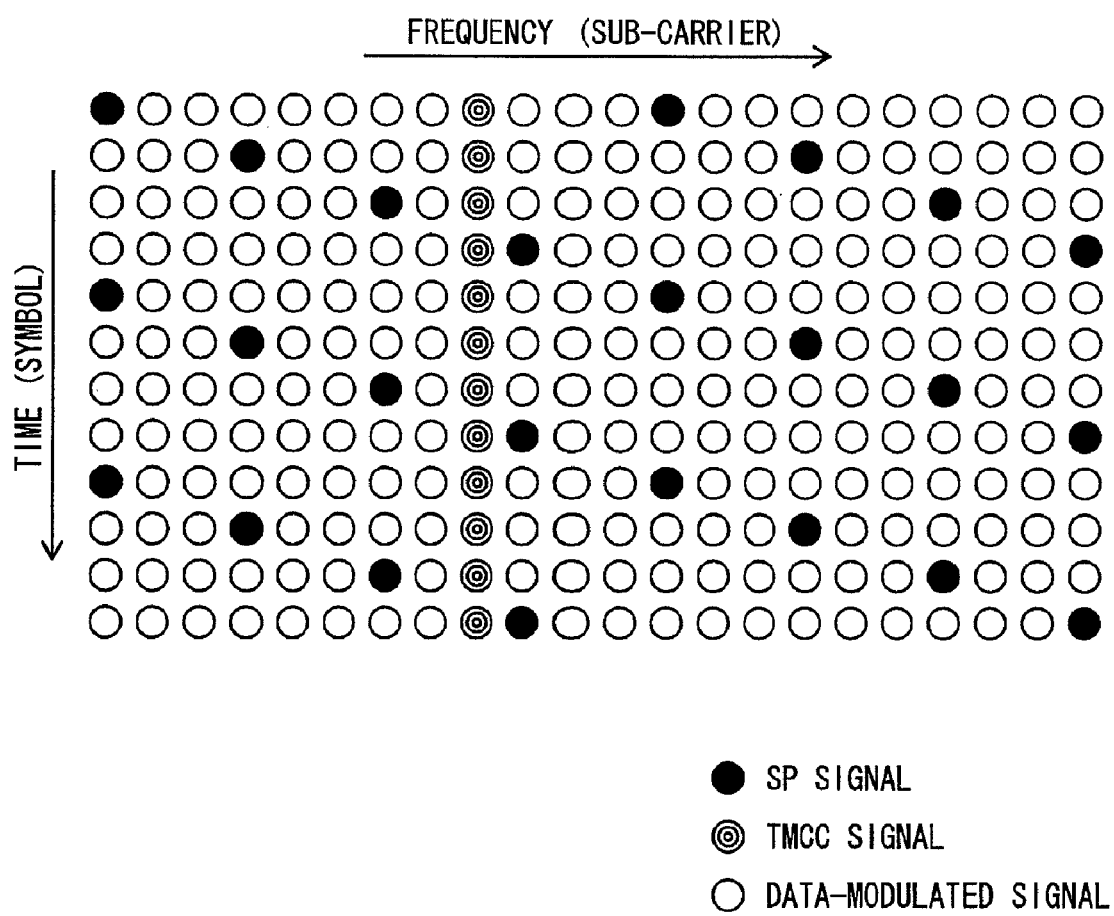
FIG. 11 is a schematic diagram showing signal arrangement of scattered pilot signals and TMCC signals according to the ISDB-T system.

Before description is given on the filter control unit 27b, signal arrangement of scattered pilot signals (SP signals) and TMCC signals are described below with reference to FIG. 11. FIG. 11 is a schematic diagram showing signal arrangement of the SP signals and TMCC signals according to the ISDB-T system. Note that in FIG. 11, the vertical axis indicates time in symbol units while the horizontal axis indicates frequency in carrier units. Also note that black circles are SP signals, triple circles are TMCC signals, and white circles are data-modulated signals modulated with transmission data.

The SP signals are signals BPSK (Binary Phase Shift Keying) modulated by the transmitter using a predetermined amplitude and a predetermined phase which are known to the receiver.

The SP signals are transmitted after being arranged as follows: an SP signal appears every 12th carrier in each symbol; each SP signal is shifted by three carriers per symbol; and the arrangement of the SP signals is repeated in cycles of four symbols.

The TMCC signals are signals which are DBPSK (Differential Binary Phase Shift Keying) modulated between symbols by control information such as a transmission parameter. A TMCC signal is placed in each symbol of multiple carriers which are other than the carriers in which SP signals are placed, and the TMCC signals placed in the multiple carriers all transmit the same control information.

<Filter Control Unit>

Figure 12:
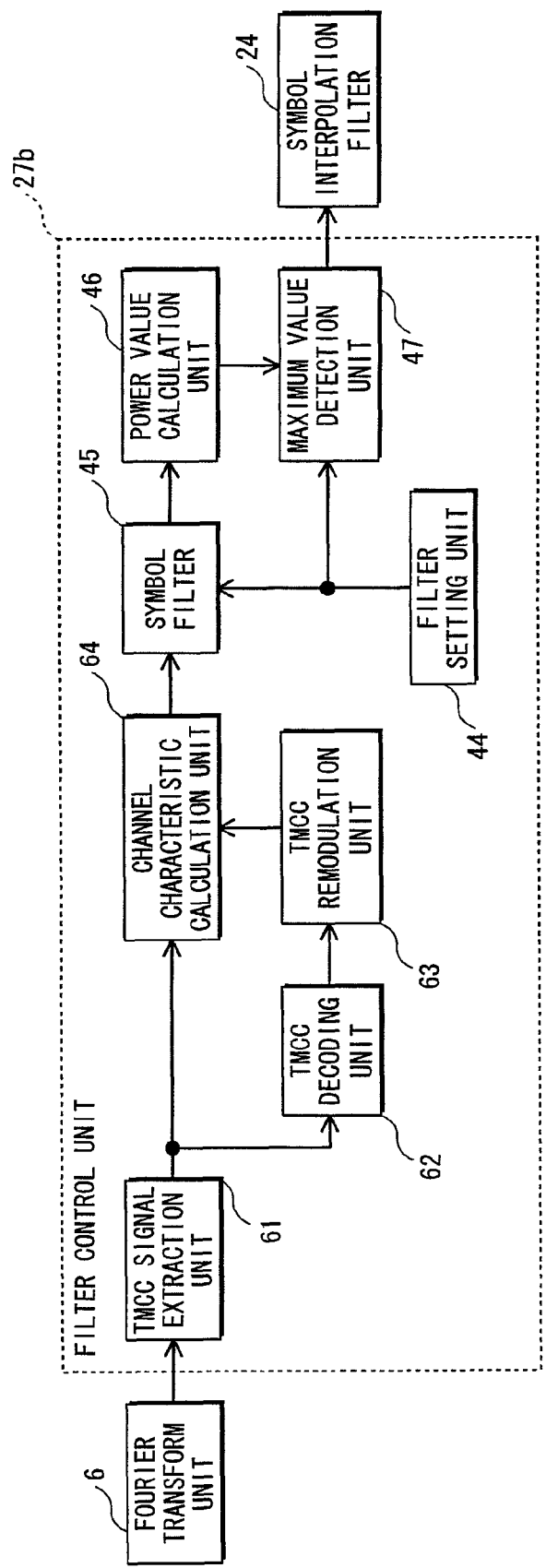
FIG. 12 shows a structure of a filter control unit of a third embodiment.

The structure of the filter control unit 27b of the present embodiment is described with reference to FIG. 12. FIG. 12 shows the structure of the filter control unit 27b of the present embodiment. Note that in the present embodiment, the structure components having the substantially same function as that in the first embodiment are assigned the same reference numbers as those in the first embodiment, and their description is omitted since the description in the first embodiment can be applied.

The filter control unit 27b includes a TMCC signal extraction unit 61, a TMCC decoding unit 62, a TMCC remodulation unit 63, a channel characteristic calculation unit 64, the filter setting unit 44, the symbol filter 45, the power value calculation unit 46, and the maximum value detection unit 47.

The received signals which have been Fourier transformed by the Fourier transform unit 6 are supplied to the TMCC signal extraction unit 61.

The TMCC signal extraction unit 61 extracts TMCC signals from the received signals Fourier-transformed by the Fourier transform unit 6, and outputs the extracted TMCC signals to the TMCC decoding unit 62 and the channel characteristic calculation unit 64.

The TMCC decoding unit 62 decodes the control information transmitted using TMCC signals, based on the TMCC signals input from the TMCC signal extraction unit 61, and outputs the control information to the TMCC remodulation unit 63. As described earlier, the TMCC signals placed in the multiple carriers in one symbol all transmit the same control information. Accordingly, the TMCC decoding unit 62 determines the transmitted control information by majority decision based on the plurality of pieces of control information in one symbol, thereby specifying the transmitted control information. This improves decoding accuracy of the control information.

The TMCC remodulation unit 63, based on the control information input from the TMCC decoding unit 62, estimates the modulation phase of the TMCC signals when transmitted by the transmitter, by performing DBPSK modulation, and outputs the signals resulting from the DBPSK modulation to the channel characteristic calculation unit 64.

The channel characteristic calculation unit 64 divides each TMCC signal input from the TMCC signal extraction unit 61 by the signal in correspondence thereto input from the TMCC remodulation unit 63. It should be noted that the division result is channel characteristics of the position where each TMCC signal extracted by the TMCC signal extraction unit 61 is arranged.

As a result of processing by the TMCC signal extraction unit 61, TMCC decoding unit 62, TMCC remodulation unit 63, and channel characteristic calculation unit 64, the filter control unit 27b estimates the channel characteristics of each symbol and outputs the estimated channel characteristics to the symbol filter 45.

The frequency shift amount of the frequency transfer characteristics of the symbol filter 45 is set by the filter setting unit 44.

The channel characteristics output from the channel characteristic calculation unit 64 are input to the power value calculation unit 46 after being filtered by the symbol filter 45. The power value calculation unit 46 calculates the power value of each of the signals which have been filtered by the symbol filter 45, and outputs the calculated power values to the maximum value detection unit 47. Processing by each of the filter setting unit 44, symbol filter 45, and power value calculation unit 46 is performed with respect to a plurality of frequency shift amounts of the frequency transfer characteristics of the symbol filter 45.

The maximum detection unit 47 observes the output signals from the power value calculation unit 46 (power value calculated by the power value calculation unit 46) and detects the maximum value among the output signals. The maximum value detection unit 47 then outputs to the symbol interpolation filter 24 the frequency control signal indicating the value of θ which is indicated, when the output signal from the power value calculation unit 46 is the maximum value, by the filter setting information input from the filter setting unit 44.

Fourth Embodiment

The following describes the fourth embodiment of the present invention with reference to the drawings.

It should be noted that in the present embodiment, a filter control unit 27c which controls the frequency-shifting of the frequency transfer characteristics of the symbol interpolation filter 24 differs from the filter control unit 27a of the second embodiment, while the other components are substantially the same as those of the second embodiment.

The filter control unit 27a of the second embodiment calculates channel characteristics of each symbol using CP signals included in the received signals after Fourier transform, and controls the frequency-shifting of the frequency transfer characteristics of the symbol interpolation filter 24 using the calculated channel characteristics.

On the other hand, the filter control unit 27c of the present embodiment calculates channel characteristics of each symbol using TMCC signals included in the received signals after Fourier transform, and controls the frequency-shifting of the frequency transfer characteristics of the symbol interpolation filter 24 using the calculated channel characteristics.

<Filter Control Unit>

Figure 13:
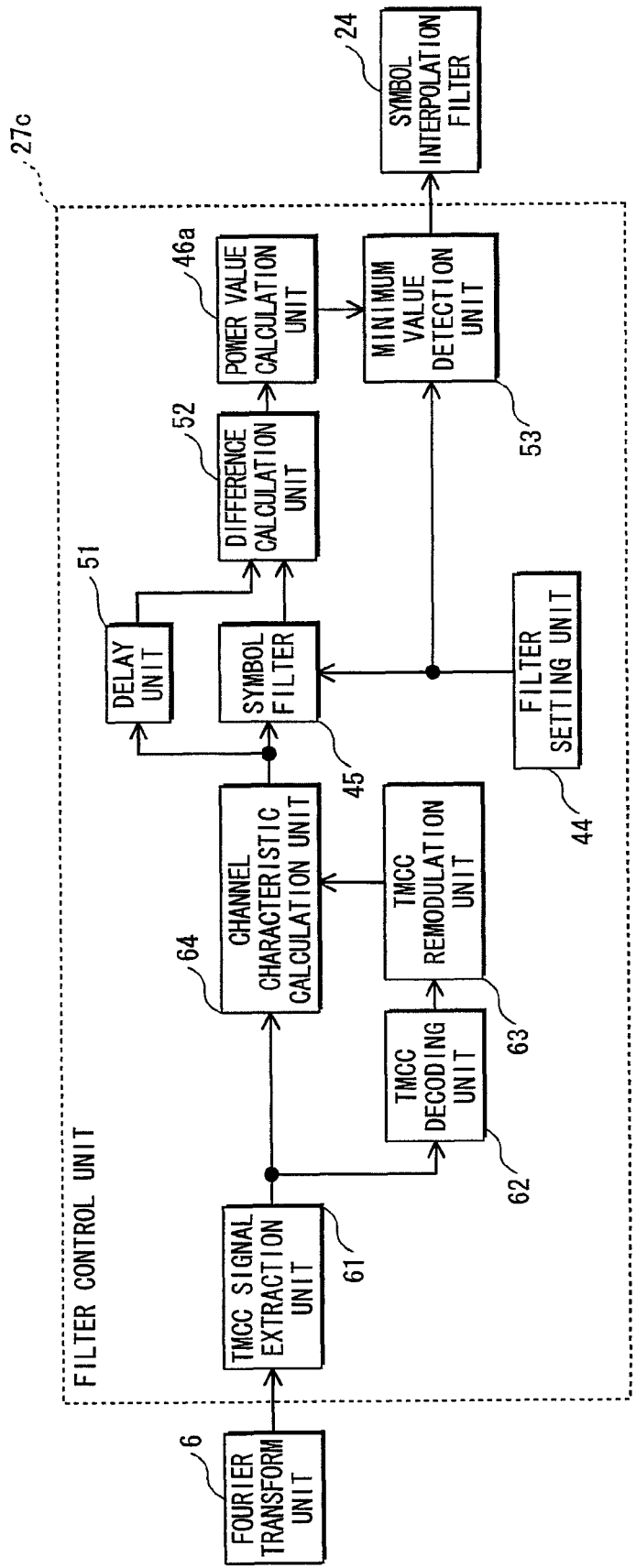
FIG. 13 shows a structure of a filter control unit of a fourth embodiment.

The structure of the filter control unit 27c of the present embodiment is described with reference to FIG. 13. FIG. 13 shows the structure of the filter control unit 27c of the fourth embodiment. Note that in the present embodiment, the structure components having the substantially same function as that in the first to third embodiments are assigned the same reference numbers as those in the first to third embodiments, and their description is omitted as the description in the first to third embodiment can be applied.

The filter control unit 27c includes the TMCC signal extraction unit 61, TMCC decoding unit 62, TMCC remodulation unit 63, channel characteristic calculation unit 64, filter setting unit 44, symbol filter 45, delay unit 51, difference calculation unit 52, power value calculation unit 46a, and minimum value detection unit 53.

As a result of processing by the TMCC signal extraction unit 61, TMCC decoding unit 62, TMCC remodulation unit 63, and channel characteristic calculation unit 64, the filter control unit 27c estimates the channel characteristics of each symbol and outputs the estimated channel characteristics to the symbol filter 45.

The frequency shift amount of the frequency transfer characteristics of the symbol filter 45 is set by the filter setting unit 44.

The frequency shift amount of the frequency transfer characteristics of the symbol filter 45 is set by the filter setting unit 44.

The channel characteristics output from the channel characteristic calculation unit 64 are input to (i) the difference calculation unit 52 after being filtered by the symbol filter 45 and (ii) the difference calculation unit 52 after being delayed by the delay unit 51. The difference calculation unit 52 calculates the difference between each of the input signals from the symbol filter 45 and the corresponding input signal from the delay unit 51, and outputs the calculation result as the output signal to the power value calculation unit 46a. The power value calculation unit 46a calculates the power values of each of the output signals of the difference calculation unit 52 and outputs the calculated power value to the minimum value detection unit 53. Processing by the filter setting unit 44, symbol filter 45, delay unit 51, difference calculation unit 52, and power value calculation unit 46a is performed with respect to a plurality of frequency shift amounts of the frequency transfer characteristics of the symbol filter 45.

The minimum value detection unit 53 observes the output signals from the power value calculation unit 46a (power values calculated by the power value calculation unit 46a) and detects the minimum value among the output signals. The minimum value detection unit 53 then outputs to the symbol interpolation filter 24 the frequency control signal indicating the value of θ which is indicated, when the output signal from the power value calculation unit 46a is the minimum value, by the filter setting information input from the filter setting unit 44.

Fifth Embodiment

The following describes the fifth embodiment of the present invention with reference to the drawings.

It should be noted that while the first to fourth embodiments control the shift amount by which to frequency-shift the frequency transfer characteristics of the symbol interpolation filter, the present embodiment controls a shift amount by which an AFC unit 4a frequency-shifts the received signals.

<Structure of Receiver>

Figure 14:
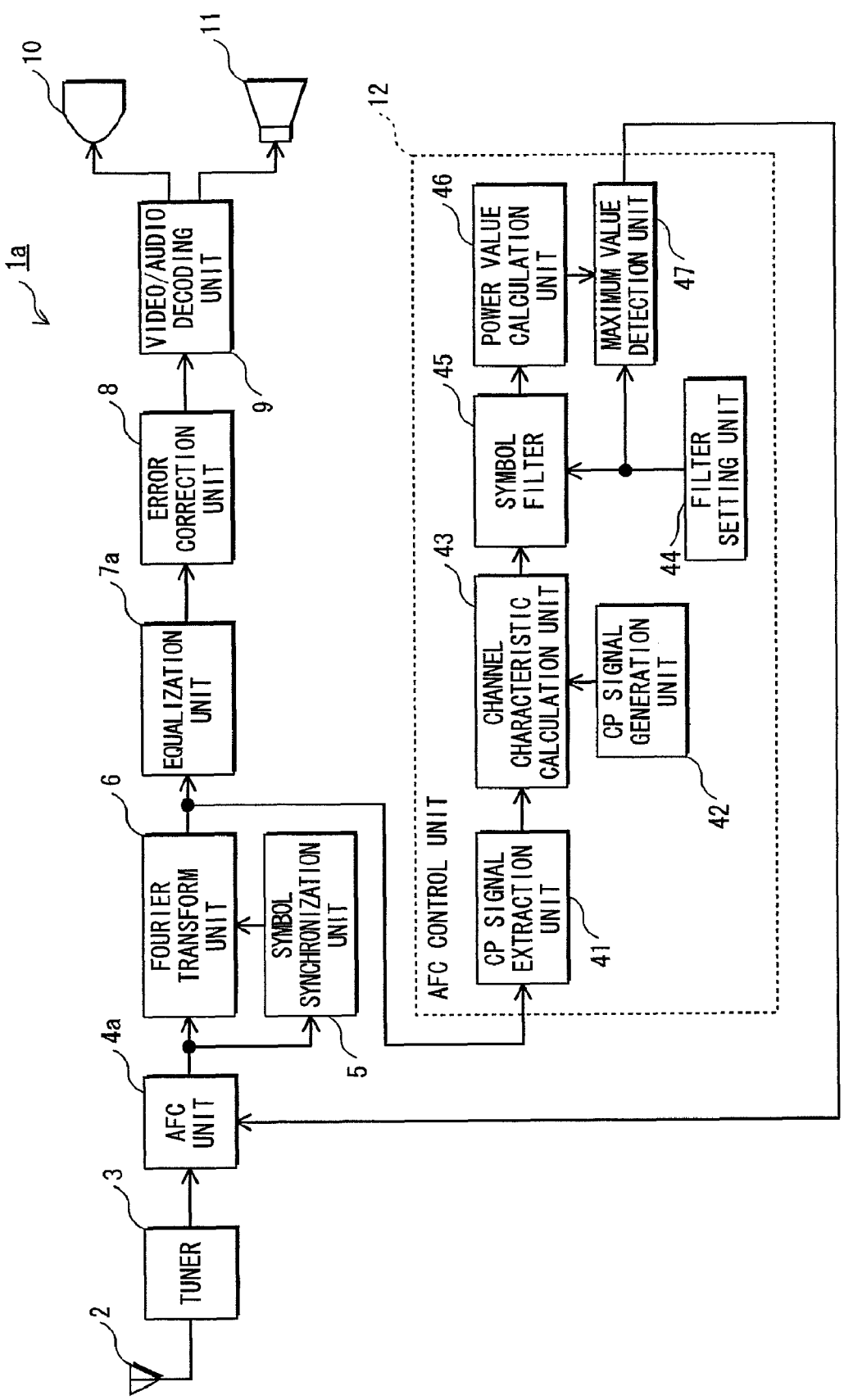
FIG. 14 shows a structure 0 of a receiver of a fifth embodiment.

A receiver 1a of the present embodiment is described below with reference to FIG. 14. FIG. 14 shows a structure of the receiver 1a of the present embodiment, the structure being an exemplary structure of a receiver which receives digital terrestrial broadcasting using the OFDM transmission system. Note that in the present embodiment, the structure components having the substantially same function as that in the first embodiment are assigned the same reference numbers as in the first embodiment, and their description is omitted as the description in the first embodiment can be applied.

The receiver 1a includes the antenna 2, the tuner 3, the AFC unit 4a, the symbol synchronization unit 5, the Fourier transform unit 6, an equalization unit 7a, the error correction unit 8, the video/audio decoding unit 9, the display unit 10, the speaker 11, and an AFC control unit 12.

The AFC unit 4a eliminates, from the received signals input from the tuner 3, a frequency error which has occurred when the tuner 3 tuned in to the broadcast wave, and outputs to the symbol synchronization unit 5 and the Fourier transform unit 6 the received signals from which the frequency error has been eliminated. The AFC unit 4a frequency-shifts the received signals input from the tuner 3, based on the value indicated by a frequency control signal input from the AFC control unit 12.

The equalization unit 7a estimates channel characteristics based on the received signals in the frequency domain input from the Fourier conversion unit 6, and equalizes and demodulates the received signals based on the estimated channel characteristics. After that, the equalization unit 7a outputs the demodulated received signals to the error correction unit 8. Note that the equalization 7a can be realized by, for example, removing the filter control unit 27 from the equalization unit 7 whose structure is shown in FIG. 4.

The AFC control unit 12 includes the CP signal extraction unit 41, CP signal generation unit 42, channel characteristic calculation unit 43, filter setting unit 44, symbol filter 45, power value calculation unit 46, and maximum value detection unit 47. It should be noted that the maximum value detection unit 47 outputs the frequency control signal to the AFC unit 4a instead of to the symbol interpolation filter 24. The CP signal extraction unit 41, CP signal generation unit 42, channel characteristic calculation unit 43, filter setting unit 44, symbol filter 45, power value calculation unit 46, and maximum value detection unit 47 each perform the substantially same processing as that in the first embodiment.

Upon reception of the frequency control signal from the AFG control unit 12, the AFC unit 4a frequency-shifts the received signals based on the shift amount indicated by the frequency control signal. For example, in a case where the value of θ indicated by the frequency control signal is $2\pi f/f_s$ (radians), the AFC unit 4a, when outputting the received signals to the symbol synchronization unit 5 and the Fourier transform unit 6, frequency-shifts the received signals by (−f) hertz and outputs the frequency-shifted received signals to the symbol synchronization unit 5 and the Fourier transform unit 6. Note that $f_s$ is a symbol frequency, and $f_s=1/T$ hertz, where the symbol cycle is T seconds.

<<Supplementary>>

The present invention is not limited the above embodiments, and can be, for example, modified as in the following.

(1) According to the above-stated embodiments, the structure in FIG. 5 is given as an exemplary structure of the symbol interpolation filter 24 and the symbol filter 45. However, it is not limited to this, and a filter configuration method such as a polyphase filter can be applied. For instance, since the symbol interpolation filter 24 receives channel characteristics once in every four symbols, a four-phase polyphase filter can be applied.

(2) According to the embodiments above, the symbol interpolation filter 24 and the symbol filter 45 are of the same structure. However, it is not limited to this, and the symbol filter 45 can be of a different structure from the symbol interpolation filter 24 as long as being able to recognize the same frequency transfer characteristics as the symbol interpolation filter 24.

(3) According to the third and fourth embodiments, the filter control units 27b and 27c use TMCC signals transmitted in the ISDB-T system to control the frequency shift amount of the frequency transfer characteristics of the symbol interpolation filter 24. However, it is not limited to this, and for example, TPS (Transmission Parameter Signaling) signals transmitted in the DVB-T system can be used.

It should be noted that the TPS signals are, as is the case with the TMCC signals, are signals which are differential BPSK modulated between the symbols by control information such as a transmission parameter. The TPS signals are arranged to appear in every symbol of each of multiple carriers, the multiple carriers being other than the carriers in which the SP signals are arranged to appear, and the TPS signals appearing in the multiple carriers in one symbol all have the same control information.

Note that the present invention is applicable without using the CP signals, TMCC signals, and TPS signals as long as the channel characteristics can be estimated based on the received signals and the frequency-shifting of the frequency transfer characteristics of the symbol interpolation filter 24 can be controlled using the estimated channel characteristics.

(4) According to the third and fourth embodiments, the TMCC decoding unit 62 determines, by majority decision, the control information transmitted using the TMCC signals based on the multiple pieces of decoding control information in one symbol, thereby specifying the control information transmitted using the TMCC signals. However, it is not limited to this, and can be, for example, as follows. The TMCC decoding unit 62 combines the TMCC signals arranged in multiple carriers in one symbol and decodes the TMCC signals using the combined TMCC signals. Or, the TMCC decoding unit 62 selects a TMCC signal with a good reception quality from among the multiple TMCC signals in one symbol and decodes the TMCC signals using the selected TMCC signal, thereby specifying the control information transmitted using the TMCC signals. Or, the TMCC decoding unit 62 decodes the TMCC signal of a predetermined carrier and specifies the control information transmitted using the TMCC signals.

(5) According to the first to fourth embodiments, the frequency transfer characteristics of the symbol interpolation filter 24 is only frequency-shifted. However, changing of the passband width of the frequency transfer characteristics and frequency-shifting of the frequency transfer characteristics, of the symbol interpolation filter 24, can be both performed. This can be realized, for example, as in the following.

The filter control unit sequentially changes the passband width of the symbol filter 24 to predetermined multiple passband widths and determines the optimum frequency shift amount for each passband width. Next, the equalization unit 7 performs equalization processing on the above-obtained combinations of the passband widths and frequency shift amounts and selects, from among the combinations, a combination with the best reception quality for its passband width and frequency shift amount. The reception quality is determined, for example, by observing an error from a modulation point of the modulated signal obtained by the equalization unit 7 or observing an error rate of input or output of the error correction unit 8.

Alternatively, it can also be realized as described below.

The filter control unit determines, with respect to the power of the output signal of the symbol filter obtained in correspondence with the determined optimum frequency shift amount, a range of frequency shift amount in accordance with which the power of the output signal of the symbol filter is kept within a predetermined range. For example, assume that the above-obtained range of frequency shift amount is $f_a$ to $f_b$. The filter control unit controls the frequency shift amount of the frequency transfer characteristics of the symbol interpolation filter 24 based on the frequency shift amount which is the average of $f_a$ and $f_b$ and narrows the passband width of the frequency transfer characteristics of the symbol interpolation filter 24 based on the frequency difference between $f_a$ and $f_b$.

Furthermore, it can be also realized as in the following.

The filter control unit holds multiple Doppler frequencies and the coefficients of the symbol interpolation filter 24, which determine the Doppler frequencies and passband widths, in one-to-one correspondence. The filter control unit estimates the Doppler frequency using the SP signals, CP signals, TMCC signals, or TPS signals in the received signals, and sets the symbol interpolation filter 24 and the symbol filter 45 to the coefficient in correspondence with the estimated Doppler frequency. Following that, as described in the first to fourth embodiments, the frequency shift amount of the frequency transfer characteristics of the symbol interpolation filter 24 is determined, and the frequency-shifting of the frequency transfer characteristics of the symbol interpolation filter 24 is controlled in accordance with the determined frequency shift amount.

Figure 15:
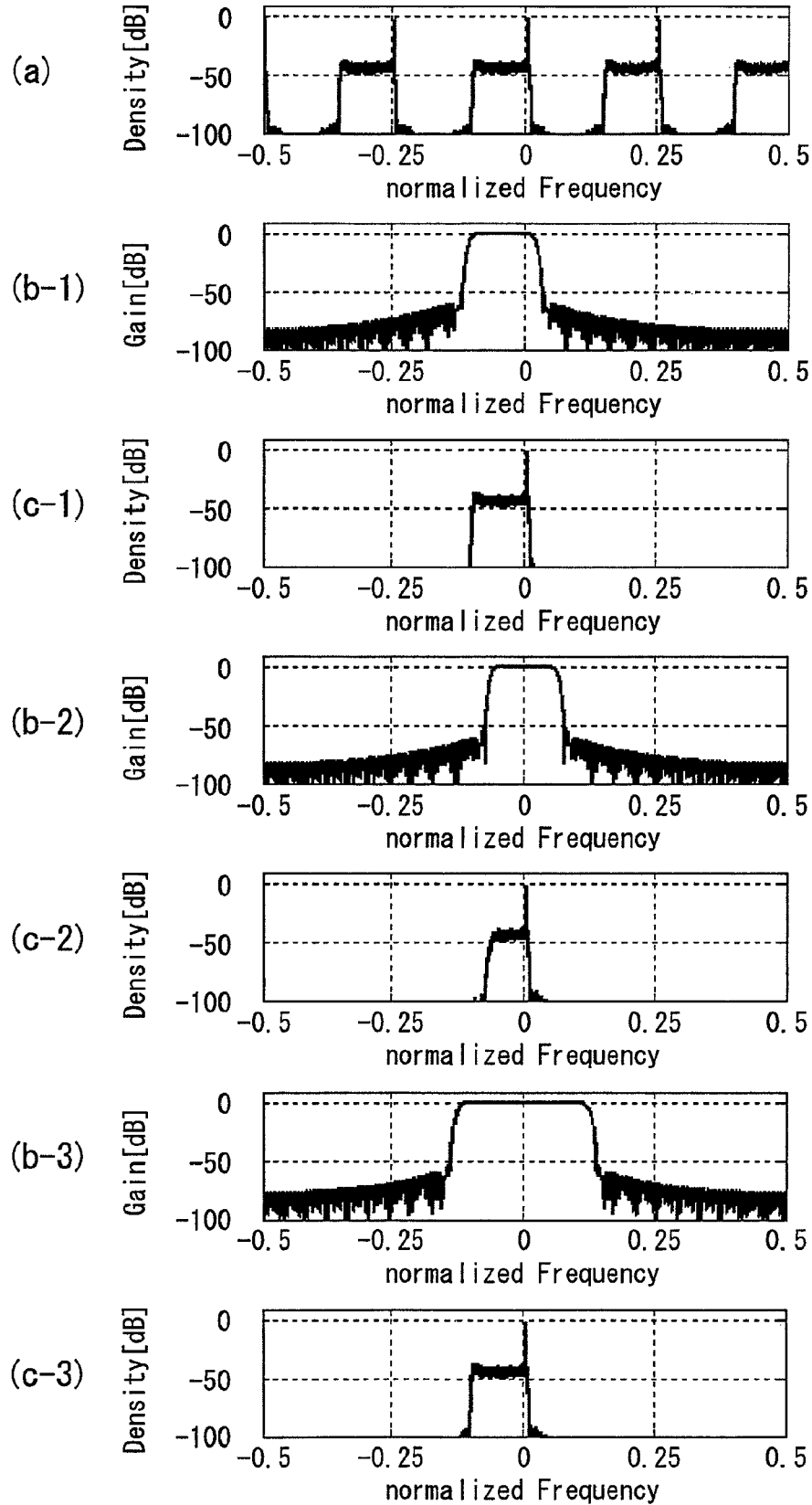
FIGS. 15(*a*) to (*c*-3) are diagrams for explaining advantages of frequency-shifting frequency transfer characteristics of a symbol interpolation filter and limiting a passband width.
Figure 16:
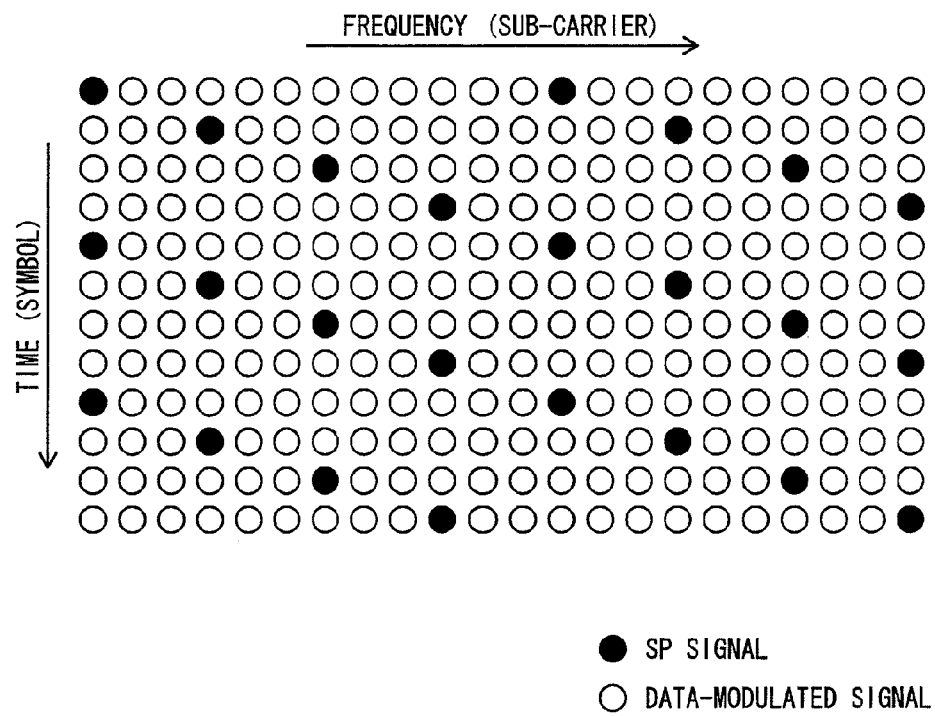
FIG. 16 is a schematic diagram showing signal arrangement of scattered pilot signals according to the ISDB-T system and the DBV-T system.
Figure 17:
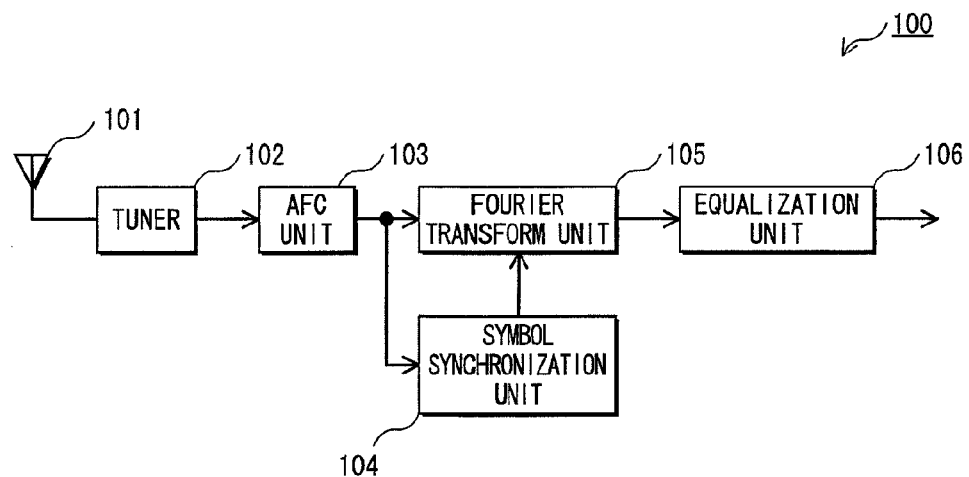
FIG. 17 shows a structure of a conventional receiver.
Figure 18:
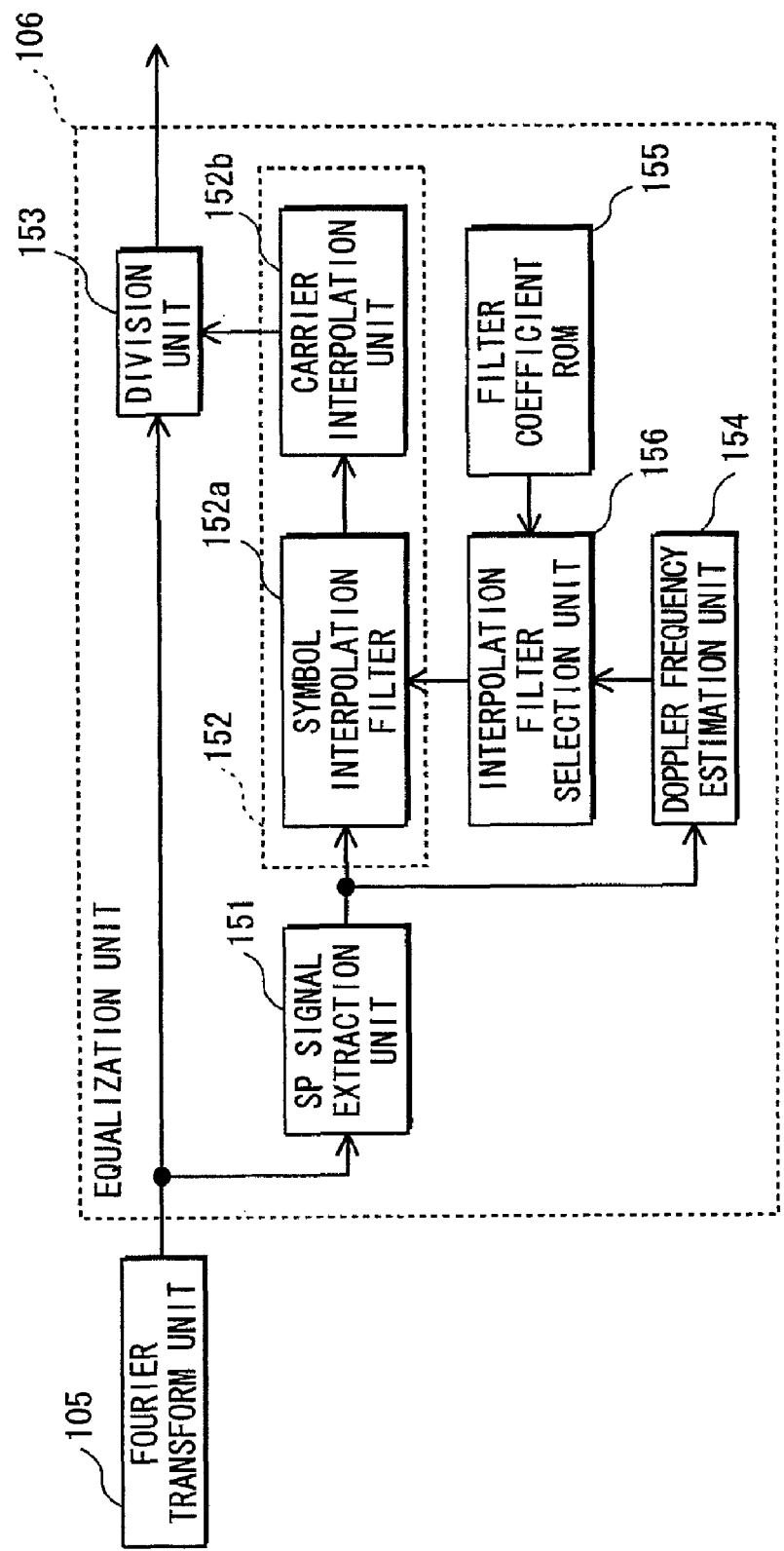
FIG. 18 shows a structure of an equalization unit in FIG. 17.

In the following, description is given on advantageous effects achieved by performing both the changing of the passband width of the frequency transfer characteristics and frequency-shifting of the frequency transfer characteristics of the symbol interpolation filter 24, with reference to FIGS. 15(a) to (c-3). FIGS. 15(a) to (c-3) are diagrams for explaining advantages of frequency-shifting frequency transfer characteristics of the symbol interpolation filter 24 and limiting the passband width. Note that in each of FIGS. 15(a) to (c-3), the horizontal axis indicates a frequency normalized by the symbol frequency $f_s$. In FIGS. 15 (a), (c-1), (c-2), and (c-3), the vertical axis indicates spectral density (dB), while in FIGS. 15(b-1), (b-2), and (b-3), the vertical axis indicates gain (dB). Note that the symbol frequency $f_s = 1/T$ hertz, where the symbol cycle is T seconds.

FIG. 15(a) indicates, in terms of the spectral density, temporal variation of the channel characteristics observed based on the SP signals. That is to say, FIG. 15(a) indicates the spectral density of the channel characteristics input from the channel characteristic calculation unit 23 to the symbol interpolation filter 24. This is a case where the moving speed of the receiver is slow and the broadening of the spectral density is small.

FIG. 15(b-1) shows the frequency transfer characteristics of the symbol interpolation filter 24, whose frequency shift amount and passband width are controlled by processing performed by the filter control unit.

FIG. 15(c-1) shows, in terms of the spectral density, the channel characteristics obtained by filtering, by the symbol interpolation filter 24 whose frequency transfer characteristics is shown in FIG. 15(b-1), the channel characteristics observed at the SP signal positions shown in FIG. 15(a).

FIG. 15(b-2) shows the channel characteristics of the symbol interpolation filter 24, only the passband width of which is controlled, as in the conventional case. Here, the passband width of the frequency transfer characteristics shown in FIG. 15(b-2) is the same as that shown in FIG. 15(b-1).

FIG. 15(c-2) shows, in terms of the spectral density, the channel characteristics obtained by filtering, by the symbol interpolation filter 24 whose frequency transfer characteristics are shown in FIG. 15(b-2), the channel characteristics observed at the SP signal positions shown in FIG. 15(a). It is apparent from FIG. 15(c-2) that the channel characteristics output from the symbol interpolation filter 24 lack low frequency components among the desired channel characteristics.

Conventionally, the passband width of the frequency transfer characteristics needs to be broad in order to allow most of the desired channel characteristics components among the channel characteristics observed at the SP signal positions to pass through. In this case, the frequency transfer characteristics of the symbol interpolation filter 24 are as shown in FIG. 15(b-3).

FIG. 15(c-3) indicates, in terms of the spectral density, the channel characteristics obtained by filtering, by the symbol interpolation filter 24 whose frequency transfer characteristics are shown in FIG. 15(b-3), the channel characteristics observed at the SP signal positions shown in FIG. 15(a). Noise components which are other than the desired channel characteristics components among the channel characteristics observed at the SP signal positions increase due to the broadening of the passband width of the frequency transfer characteristics of the symbol interpolation filter 24.

By frequency-shifting the frequency transfer characteristics of the symbol interpolation filter 24, the passband width of the frequency transfer characteristics of the symbol interpolation filter 24 can be properly selected.

(6) As the structure of the AFC control unit of the fifth embodiment, for example, the structure of the filter control unit 27a of the second embodiment, the filter control unit 27b of the filter control unit of the third embodiment, or the structure of the filter control unit 27c of the fourth embodiment can be used. Note that the maximum value detection unit 47 of the filter control unit 27b outputs the frequency control signals to the AFC unit 4a instead of to the symbol interpolation filter 24. Also, the minimum value detection unit 53 of the filter control units 27a and 27c outputs the frequency control signals to the AFC unit 4a instead of to the symbol interpolation filter 24.

(7) The AFC unit 4 of the first to fourth embodiments and the AFC unit 4a of the fifth embodiment are not limited to the structure shown in FIG. 2, and can be, for example, a structure eliminating, based on a change in phase of the pilot signals included in the received signals, a frequency error which has occurred when a broadcast wave is tuned to.

(8) The receivers of the above-described embodiments may be typically realized as a LSI (Large Scale Integration) which is an integrated circuit. These structures may be separately accumulated as an individual chip. Or, part or all of these structures may be included on one chip. For example, the tuner 3 may be accumulated on the same integrated circuit as other circuit units, or may be accumulated on a separate integrated circuit.

Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (Field Programmable Gate Array) that is programmable after manufacturing of the LSI, or a re-configurable processor that enables re-configuration of the connection and settings of circuit cells in the LSI.

Additionally, if a semiconductor technology or related technologies give birth to a new circuit-integrating technology that would replace the LSI, such technologies may be used for integrating the functional blocks. One such possibility is an application of biotechnology.

INDUSTRIAL APPLICABILITY

The present invention can be applied to a receiver receiving signals of a multi-carrier transmission system, for example, a receiver receiving digital terrestrial broadcasting such as the ISDB-T system or DVTB-T system using the OFDM transmission system which is a multi-carrier transmission system.

The present invention can be also applied to a receiver receiving signals of a single-carrier transmission system.

The invention claimed is:

1. A receiver comprising:
   a channel characteristic calculation unit operable to calculate, based on pilot signals included in received signals, channel characteristics with respect to the pilot signals;
   a filter unit operable to perform, on the calculated channel characteristics, processing, which is at least one of (i) an interpolation and (ii) band limitation, using filter processing having frequency transfer characteristics capable of being frequency-shifted;
   an equalization unit operable to equalize the received signals based on the processed channel characteristics obtained as a result of the processing performed by the filter unit; and
   a filter control unit operable to determine a shift amount by which the frequency transfer characteristics are frequency-shifted, and control the frequency transfer characteristics,
   wherein the received signals include first signals being signals other than the pilot signals,
   wherein intervals in units of symbols at which the first signals are inserted into any one of carriers into which the first signals are inserted are shorter than intervals in units of symbols at which the pilot signals are inserted into any one of carriers into which the pilot signals are inserted,
   wherein the filter control unit observes channel characteristics with respect to the first signals included in the received signals and determines the shift amount based on a result of the observation, and
   wherein the filter unit frequency-shifts the frequency transfer characteristics by the determined shift amount.

2. The receiver of claim 1, wherein the filter control unit includes:
   a first channel characteristic calculation unit operable to calculate the channel characteristics with respect to the first signals based on the first signals;
   a first filter unit operable to perform filter processing on the channel characteristics calculated by the first channel characteristic calculation unit, while sequentially frequency-shifting the frequency transfer characteristics of the filter processing; and
   a shift amount determination unit operable to observe output signals of the first filter unit and determine the shift amount based on a result of the observation of the output signals.

3. The receiver of claim 2, wherein the shift amount determination unit includes:
   a power value calculation unit operable to, for each of the output signals, respectively calculate an electric power value and output a calculation result as an electric power value output signal; and
   a maximum value detection unit operable to (i) detect, by observing the electric power value output signals output from the power value calculation unit, a maximum value from among values of the electric power value output signals output from the power value calculation unit and (ii) determine the shift amount, based on a shift amount of the frequency transfer characteristics of the first filter unit when the electric power value output signal output from the power value calculation unit is the maximum value.

4. The receiver of claim 2, wherein the shift amount determination unit includes:
   a difference calculation unit operable to, for each of output signals of the first channel characteristic calculation unit, (i) respectively calculate a difference between (a) the respective output signal of the first channel characteristic calculation unit and (b) a signal obtained as a result of performing the filtering processing on the respective output signal of the first channel characteristic calculation unit by the first filter unit and (ii) output the calculated difference as a calculated difference output signal;
   a power value calculation unit operable to, for each of the calculated difference output signals output from of the difference calculation unit, calculate an electric power value and output a calculation result as an electric power value output signal; and
   a minimum value detection unit operable to (i) detect, by observing the electric power value output signals output from the power value calculation unit, a minimum value from among values of the electric power value output signals output from the power value calculation unit and (ii) determine the shift amount, based on a shift amount of the frequency transfer characteristics of the first filter unit when the electric power value output signal output from the power value calculation unit is the minimum value.

5. The receiver of claim 2, wherein the first signals are inserted in every symbol.

6. The receiver of claim 2, wherein the first signals are continual pilot signals in a DVB-T system.

7. The receiver of claim 2, wherein the first signals are one of TMCC signals in an ISDB-T system and TPS signals in a DVB-T system.

8. The receiver of claim 7, wherein the first channel characteristic calculation unit includes:
  a decoding unit operable to decode the one of the TMCC signals and the TPS signals;
  a remodulation unit operable to perform DBPSK-modulation, based on a decoding result of the decoding unit, with respect to control information transmitted using the one of the TMCC signals and the TPS signals; and
  a calculation unit operable to calculate the channel characteristics with respect to the one of the TMCC signals inserted in the received signals and the TPS signals inserted in the received signals based on (a) the one of the TMCC signals and the TPS signals inserted in the received signals and (b) one of TMCC signals and TSP signals obtained as a result of the DBPSK-modulation.

9. The receiver of claim 1,
  wherein the filter unit operable to change a passband width of the frequency transfer characteristics,
  wherein the filter control unit observes the calculated channel characteristics with respect to the first signals and determines the passband width based on the result of the observation; and
  wherein the filter unit changes the passband width of the frequency transfer characteristics based on the passband width determined by the filter control unit.

10. A receiver comprising:
  an automatic frequency control unit operable to frequency-shift received signals so as to eliminate a frequency error in the received signals;
  a channel characteristic calculation unit operable to calculate, based on pilot signals included in the frequency-shifted received signals, channel characteristics with respect to the pilot signals;
  a filter unit operable to perform, on the calculated channel characteristics, processing, which is at least one of (i) an interpolation and (ii) band limitation, using filter processing;
  an equalization unit operable to equalize the received signals based on the processed channel characteristics obtained as a result of the processing performed by the filter unit; and
  a control unit operable to determine a shift amount by which the automatic frequency control unit frequency-shifts the received signals, and controls frequency-shifting of the received signals by the automatic frequency control unit,
  wherein the received signals include first signals being signals other than the pilot signals,
  wherein intervals in units of symbols at which the first signals are inserted into any one of carriers into which the first signals are inserted are shorter than intervals in units of symbols at which the pilot signals are inserted into any one of carriers into which the pilot signals are inserted,
  wherein the control unit observes channel characteristics with respect to the first signals included in the received signals and determines the shift amount based on a result of the observation, and
  wherein the automatic frequency control unit frequency-shifts the received signals by the determined shift amount.

11. An integrated circuit comprising:
  a channel characteristic calculation unit operable to calculate, based on pilot signals included in received signals, channel characteristics with respect to the pilot signals;
  a filter unit operable to perform, on the calculated channel characteristics, processing, which is at least one of (i) an interpolation and (ii) band limitation, using filter processing having frequency transfer characteristics capable of being frequency-shifted;
  an equalization unit operable to equalize the received signals based on the processed channel characteristics obtained as a result of the processing performed by the filter unit; and
  a filter control unit operable to determine a shift amount by which the frequency transfer characteristics are frequency-shifted, and control the frequency transfer characteristics,
  wherein the received signals include first signals being signals other than the pilot signals,
  wherein intervals in units of symbols at which the first signals are inserted into any one of carriers into which the first signals are inserted are shorter than intervals in units of symbols at which the pilot signals are inserted into any one of carriers into which the pilot signals are inserted,
  wherein the filter control unit observes channel characteristics with respect to the first signals included in the received signals and determines the shift amount based on a result of the observation, and
  wherein the filter unit frequency-shifts the frequency transfer characteristics by the determined shift amount.

12. An integrated circuit comprising:
  an automatic frequency control unit operable to frequency-shift received signals so as to eliminate a frequency error in the received signals;
  a channel characteristic calculation unit operable to calculate, based on pilot signals included in the frequency-shifted received signals, channel characteristics with respect to the pilot signals;
  a filter unit operable to perform, on the calculated channel characteristics, processing, which is at least one of (i) an interpolation and (ii) band limitation, using filter processing;
  an equalization unit operable to equalize the received signals based on the processed channel characteristics obtained as a result of the processing performed by the filter unit; and
  a control unit operable to determine a shift amount by which the automatic frequency control unit frequency-shifts the received signals, and controls frequency-shifting of the received signals by the automatic frequency control unit,
  wherein the received signals include first signals being signals other than the pilot signals,
  wherein intervals in units of symbols at which the first signals are inserted into any one of carriers into which the first signals are inserted are shorter than intervals in units of symbols at which the pilot signals are inserted into any one of carriers into which the pilot signals are inserted
  wherein the control unit observes channel characteristics with respect to the first signals included in the received signals and determines the shift amount based on a result of the observation, and
  wherein the automatic frequency control unit frequency-shifts the received signals by the determined shift amount.

13. A reception method comprising:
  a channel characteristic calculation step of calculating, based on pilot signals included in received signals, channel characteristics with respect to the pilot signals;
  a filtering step of performing, on the calculated channel characteristics, processing, which is at least one of (i) an interpolation and (ii) band limitation, using filter processing having frequency transfer characteristics capable of being frequency-shifted;

an equalizing step of equalizing the received signals based on the processed channel characteristics obtained as a result of the processing performed by the filtering step; and a filter controlling step of determining a shift amount by which the frequency transfer characteristics are frequency-shifted, and controlling the frequency transfer characteristics, wherein the received signals include first signals being signals other than the pilot signals, wherein intervals in units of symbols at which the first signals are inserted into any one of carriers into which the first signals are inserted are shorter than intervals in units of symbols at which the pilot signals are inserted into any one of carriers into which the pilot signals are inserted, wherein the filter controlling step observes channel characteristics with respect to the first signals included in the received signals and determines the shift amount based on a result of the observation, and wherein the filtering step frequency-shifts the frequency transfer characteristics by the determined shift amount.

14. A reception method comprising:

an automatic frequency controlling step of frequency-shifting received signals so as to eliminate a frequency error in the received signals;

a channel characteristic calculating step of calculating, based on pilot signals included in the frequency-shifted received signals, channel characteristics with respect to the pilot signals;

a filtering step of performing, on the calculated channel characteristics, processing, which is at least one of (i) an interpolation and (ii) band limitation, using filter processing;

an equalizing step of equalizing the received signals based on the processed channel characteristics obtained as a result of the processing performed by the filtering step; and a controlling step of determining a shift amount by which the automatic frequency controlling step frequency-shifts the received signals, and controlling frequency-shifting of the received signals by the automatic frequency controlling step, wherein the received signals include first signals being signals other than the pilot signals, wherein intervals in units of symbols at which the first signals are inserted into any one of carriers into which the first signals are inserted are shorter than intervals in units of symbols at which the pilot signals are inserted into any one of carriers into which the pilot signals are inserted, wherein the controlling step observes channel characteristics with respect to the first signals included in the received signals and determines the shift amount based on a result of the observation, and wherein the automatic frequency controlling step frequency-shifts the received signals by the determined shift amount.

* * * * *